(12) United States Patent
Burroughs et al.

(10) Patent No.: US 12,482,318 B2
(45) Date of Patent: *Nov. 25, 2025

(54) MOVABLE BARRIER OPERATOR WITH ULTRA-WIDEBAND DEVICE

(71) Applicant: THE CHAMBERLAIN GROUP LLC, Oak Brook, IL (US)

(72) Inventors: Michael Aaron Burroughs, Chicago, IL (US); James J. Fitzgibbon, Batavia, IL (US); James D. Johnson, Algonquin, IL (US); David R. Morris, Glenview, IL (US); Christopher J. Staub, Aurora, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,274

(22) Filed: May 23, 2024

(65) Prior Publication Data
US 2024/0312276 A1    Sep. 19, 2024

Related U.S. Application Data

(63) Continuation of application No. 18/115,148, filed on Feb. 28, 2023, now Pat. No. 12,020,524, which is a (Continued)

(51) Int. Cl.
G07C 9/10    (2020.01)
G07C 9/00    (2020.01)
G07C 9/25    (2020.01)

(52) U.S. Cl.
CPC .......... *G07C 9/10* (2020.01); *G07C 9/00174* (2013.01); *G07C 9/25* (2020.01); *G07C 2009/00769* (2013.01)

(58) Field of Classification Search
CPC ........ G07C 9/10; G07C 9/00174; G07C 9/25; G07C 2009/00769; G07C 9/00571; G07C 9/00896; G07C 2009/00928
See application file for complete search history.

(56) References Cited

U.S. PATENT DOCUMENTS 6,737,968 B1 * 5/2004 Ergun ................... E05F 15/668
                                                              49/27
9,923,879 B1 * 3/2018 Ziraknejad ............ H04L 63/107
(Continued)

*Primary Examiner* — Tuyen K Vo
(74) *Attorney, Agent, or Firm* — Dority & Manning, P.A.

(57) ABSTRACT

Systems, methods, and apparatuses for managing and controlling movable barrier operator systems are described herein. A method for controlling a movable barrier operator system comprises receiving a credential associated with a first user account from a first user device, storing the credential in a memory of the movable barrier operator system, communicating the credential and an identifier of the movable barrier operator system to a remote computer to register the movable barrier operator system with the remote computer, and configuring the movable barrier operator system to change a state of a movable barrier in response to the movable barrier operator system receiving a state change request from a second user device associated with a second user account, the state change request from the second user device including the credential or a derivative of the credential received from the first user device.

20 Claims, 14 Drawing Sheets

Related U.S. Application Data continuation of application No. 17/314,411, filed on May 7, 2021, now Pat. No. 11,600,126.

(56) References Cited

U.S. PATENT DOCUMENTS

| | | | |
|---|---|---|---|
| 2008/0164973 A1* | 7/2008 | Mamaloukas | G07C 9/00309 |
| | | | 455/127.5 |
| 2014/0171032 A1* | 6/2014 | Huang | H04W 4/80 |
| | | | 455/414.1 |
| 2016/0148451 A1* | 5/2016 | Menkveld | E05F 15/77 |
| | | | 340/5.71 |
| 2017/0236354 A1* | 8/2017 | Baker | H04W 12/08 |
| | | | 340/5.71 |
| 2019/0236877 A1* | 8/2019 | Scoggins | G07C 9/28 |
| 2021/0102421 A1* | 4/2021 | Fitzgibbon | E05F 15/77 |
| 2021/0142601 A1* | 5/2021 | Schoenfelder | H04L 67/125 |

\* cited by examiner

MOVABLE BARRIER OPERATOR WITH ULTRA-WIDEBAND DEVICE

CROSS-REFERENCE TO RELATED APPLICATIONS

This application is a continuation of U.S. patent application Ser. No. 18/115,148, filed Feb. 28, 2023, which is a continuation of U.S. patent application Ser. No. 17/314,411, filed May 7, 2021, entitled MOVABLE BARRIER OPERATOR SYSTEM AND METHODS OF INSTALLATION AND USE, which claims the benefit of U.S. Provisional application No. 63/022,158, filed May 8, 2020, which are all incorporated by reference in their entireties herein.

FIELD

The present disclosure generally relates to movable barrier operator systems and, more specifically, to network-enabled movable barrier operator systems.

BACKGROUND

Various types of movable barrier operators are known such as garage door openers, gate operators, and rolling shutters, as a few examples. In recent years, movable barrier operators such as garage door openers have been adapted to be controlled via an application on a user device, such as a smartphone. These garage door openers may be connected to a homeowner's Wi-Fi network to facilitate user control via a web browser or a smartphone application.

However, some potential challenges exist regarding these network enabled garage door openers. In setting up the garage door opener with the homeowner's Wi-Fi network, an installer may be required to ask a homeowner for the homeowner's Wi-Fi network password to connect the garage door opener to the Wi-Fi network. This may be inconvenient for the installer and/or the homeowner. Another potential challenge occurs when the installer installs a garage door opener in a home that is being built or has recently been built. The home may not yet have a Wi-Fi network such that the installer is unable to configure the garage door opener with a network connection. Once the home is finished a homebuyer or resident may then have to complete the network connection for the garage door opener or call the installer or homebuilder for help.

Moreover, when a homeowner updates their home Wi-Fi network or changes their Wi-Fi password, a homeowner is required to reconnect their garage door opener system to an updated Wi-Fi network. The homeowner may not recognize that they need to provide the updated network information to the garage door opener and may call a service technician.

Another issue with Wi-Fi connected garage door openers occurs when a homeowner's home Wi-Fi network has poor quality of service (QOS) or performance (e.g., weak signal strength, low bandwidth/throughput, high latency, packet loss, etc.) in the homeowner's garage. Extremely weak signal strength (e.g., bordering on nonexistent signal strength) may occur, for example, with garage door openers in detached garages or for garage door openers in garages of condominiums or apartment complexes where the garage door opener is not within range of the homeowner's Wi-Fi network. These garage door openers may not be reliably controlled from a homeowner's smartphone because the garage door openers are not reliably connected to the respective network.

DETAILED DESCRIPTION

Figure 1A:
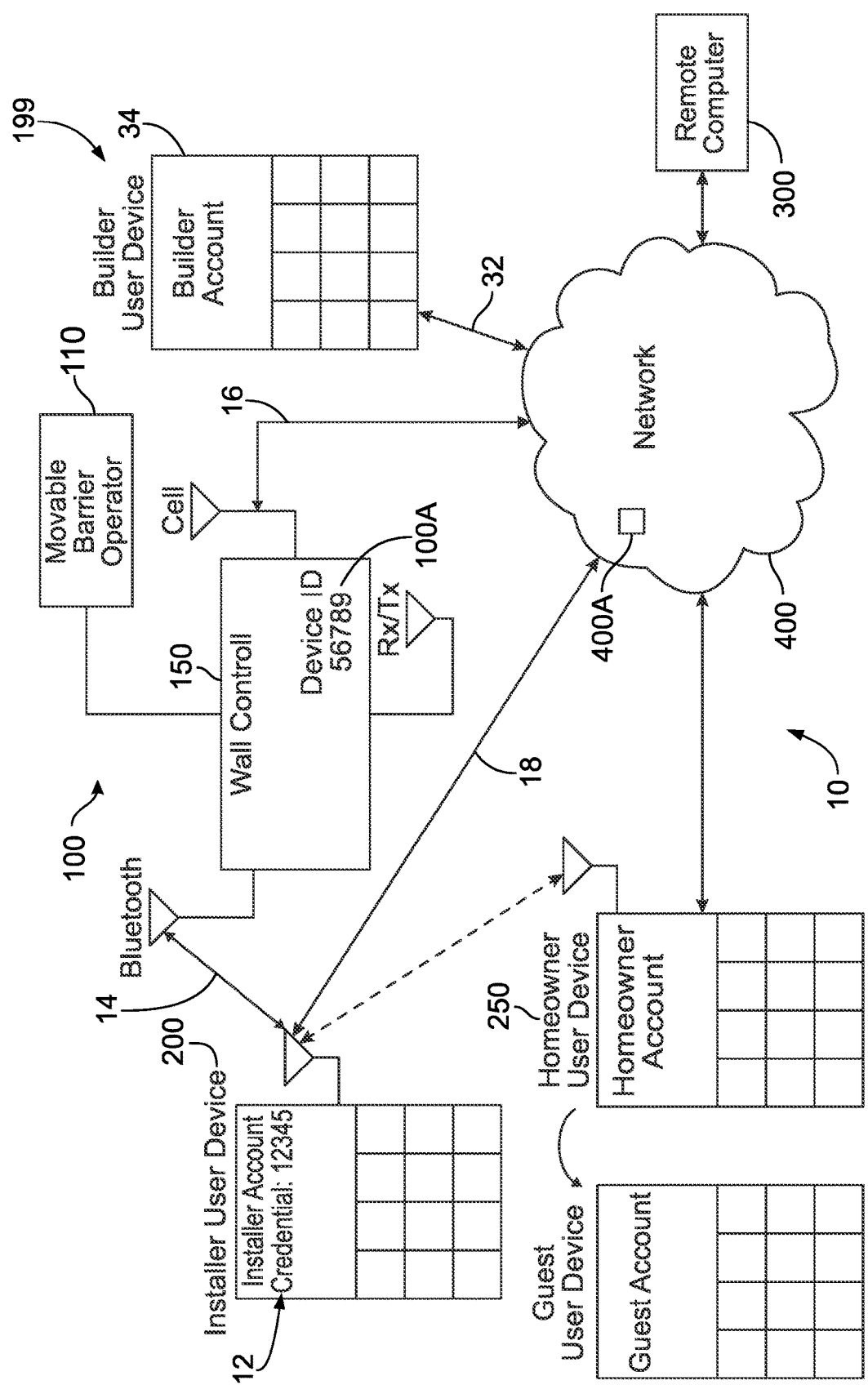
FIG. 1A is a schematic diagram of an example system showing the communication of a credential between a movable barrier operator system, a remote computer, and user devices.

With reference to FIG. 1A, a system 10 is provided for installing and credentialing a movable barrier operator system 100. An installer 11 (see FIGS. 1B to 1D) may physically install one or more components of the movable barrier operator system 100 in a building, such as in a garage of a house. The movable barrier operator system 100 may change the state of a movable barrier upon the movable barrier operator system 100 receiving control signals (e.g., constituted by changing or rolling codes) which include a credential 12 that corresponds to a credential stored in a memory of the movable barrier operator system 100. The installer user device 200 initially receives, has, or generates the credential 12. The installer 11 may establish a direct wireless communication between the installer user device 200 and the movable barrier operator system 100 and transfer 14 the credential 12 to the movable barrier operator system 100. Alternatively, a credential stored in the movable barrier operator system 100 may be transferred 14 to the installer user device 200.

Figure 1B:
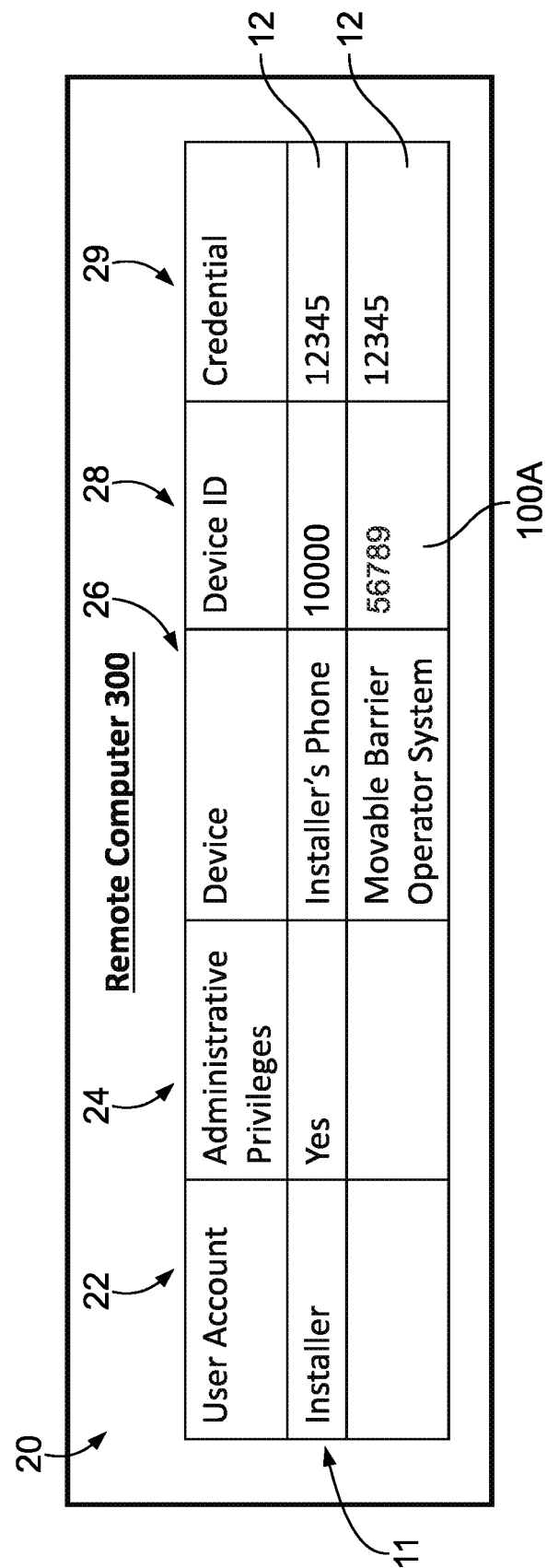
FIG. 1B is an example table stored in a remote computer showing the association of the credential with the movable barrier operator system and an installer's user device.

The movable barrier operator system 100 includes an identifier 100A, such as a globally unique identification, that is stored in the memory of the movable barrier operator system 100. The credential 12 that is transferred between the movable barrier operator system 100 and the installer user device 200 may be associated with the identifier 100A and stored in a data structure or array such as a table 20 (see FIGS. 1B-1D). The table 20 may include data identifying a user account 22, an identification 24 of whether the user account 22 has administrative privileges, a device name 26, a device identification (ID) 28, and a credential field 29. The movable barrier operator system 100 may communicate 16 the credential 12 that is associated with the device ID 28 to a remote computer 300 associated with the movable barrier operator system 100 via a direct connection to a base station 400A of a network 400. The network 400 may be a wide-area network such as, for example, a cellular network. The installer user device 200 may also communicate 18 the credential to the remote computer 300. As shown in FIG. 1B, the remote computer 300 stores the association of the credential 12 to the movable barrier operator system 100 and the installer user device 200 and/or user account 22 of the installer 11. The user account 22 may be a virtual profile of a user associated with an application that includes a username, user ID, password, email address, and/or other information and settings associated with the user.

Figure 1C:
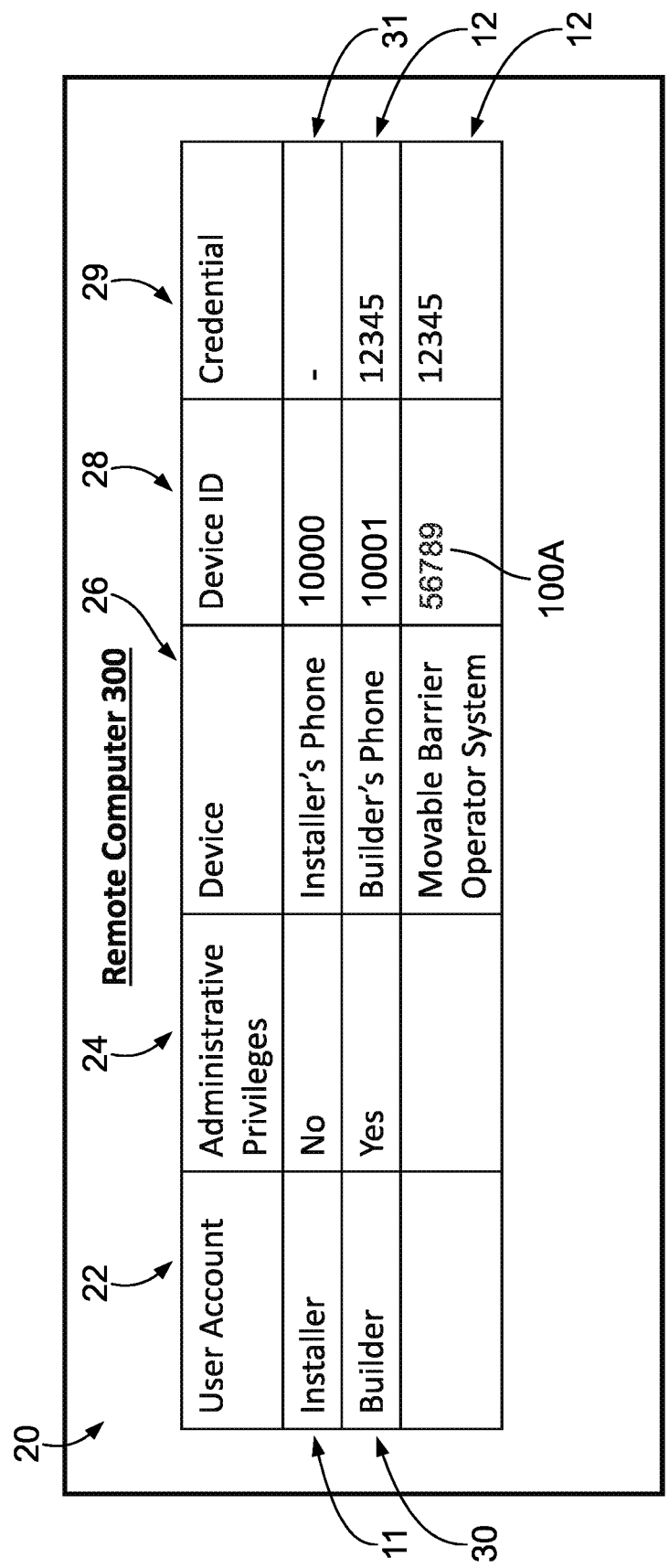
FIG. 1C is an example table stored in a remote computer showing a change in the association of the credential from the installer to the builder.

Once the installer 11 has completed installation of the movable barrier operator system 100, the installer may then transfer the credential 12 stored on the installer user device 200 to a builder 30 to enable control of the movable barrier operator system 100 by the builder 30. The status (e.g., open, closed, etc.) of a movable barrier associated with the barrier operator system 100 may also be transferred to the builder 30. For example, the movable barrier operator system 100 may be installed while the home is under construction and a homeowner does not yet live in the home. The installer 11 may transfer management and/or control by communicating 32 the credential 12 from the installer user device 200 to a builder user device 34 directly or via the network 400. Upon transfer of the credential 12, the movable barrier operator system 100 is configured to no longer respond to control signals from the installer user device 200. As shown in FIG. 1C, the remote computer 300 may update the table of associations to reflect the transfer of the credential 12 to the builder's user device 34 and/or an associated user account 22, and update the association of the builder's user device 34 and/or user account to the movable barrier operator system 100. The remote computer 300 may provide a value 31 (e.g., a random number or null) in the credential field 29 for the installer to disassociate the credential 12 from a user account and/or device 12 of the installer 11.

Figure 1D:
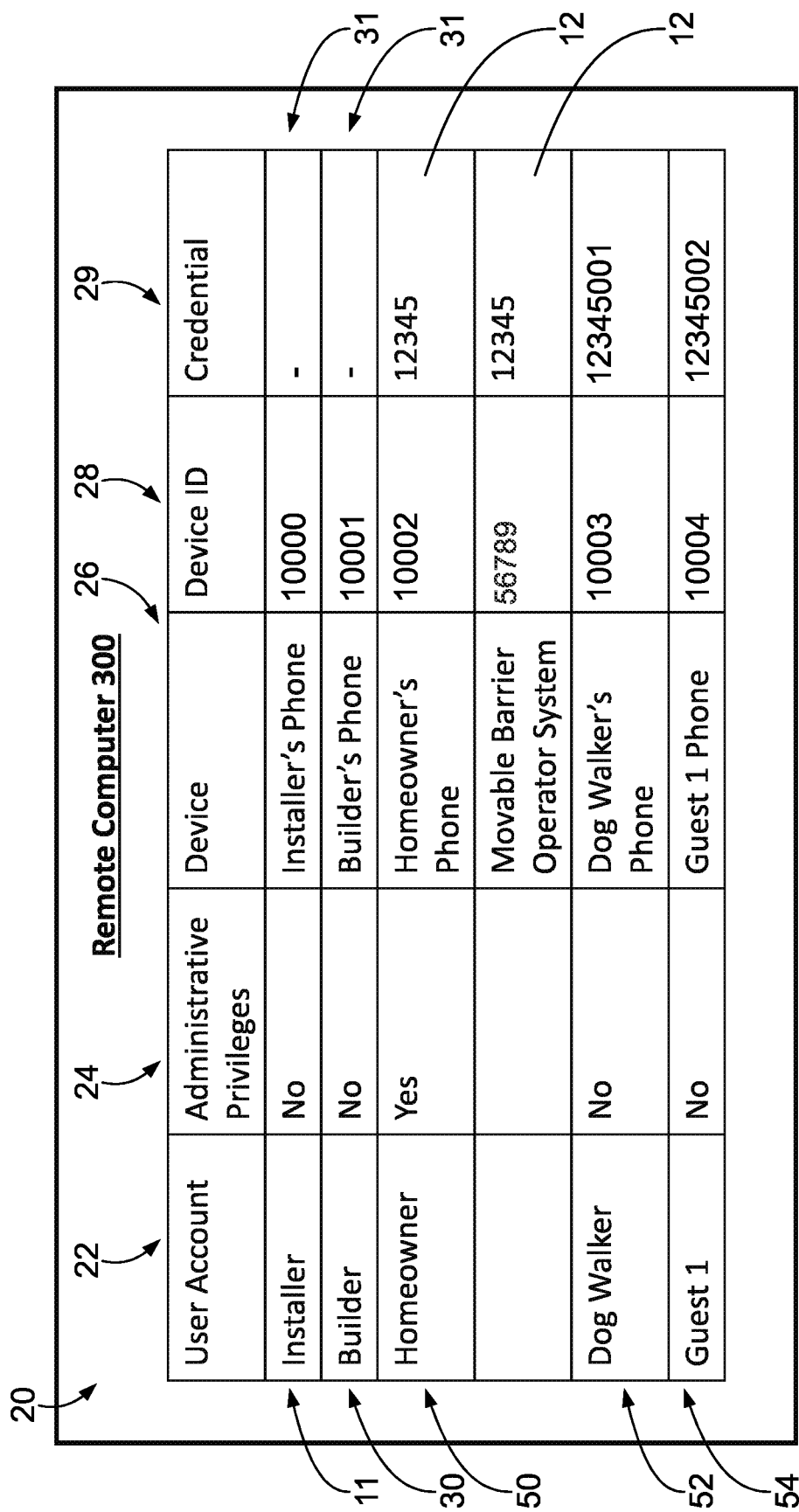
FIG. 1D is an example table stored in a remote computer showing a change in the association of the credential from the builder to the homeowner, the table also showing derivatives of the credential associated with guest devices.

When the builder 30 desires to transfer the credential 12 to another entity, for example, a homebuyer or homeowner 50, the builder 30 may request via the builder user device 34 that the credential 12 be transferred to a user account 22 of the homeowner 50 to enable control of the movable barrier operator system 100 by the homeowner 50. The builder user device 34 and/or the remote computer 300 communicates the credential 12 to the homeowner user device 250. This process is similar to the process of the installer 11 transferring the credential 12 to the builder 30 and may similarly be used for subsequent transfers. As shown in FIG. 1D, upon transfer of the credential 12 from the builder 30 to the homeowner 50, the table 20 of associations stored in the remote computer 300 is updated to reflect the transfer and the new association of the movable barrier operator system 100 and the homeowner's user device 250 and/or user account. The remote computer 300 may provide a value 31 in the credential field 29 to indicate that the credential 12 has been transferred and is no longer associated with the builder 30 for use by the builder 30. Various ones of the user accounts may also be configured to create sub-rights for other user accounts to have control of the movable barrier operator system 100, for example, a dog walker 52, or guests 54. The user accounts with sub-rights may have limited control of the movable barrier operator system 100. The user accounts having sub-rights also do not have administrative privileges and would thus not be able to transfer the credential 12 to another user account.

Figure 2:
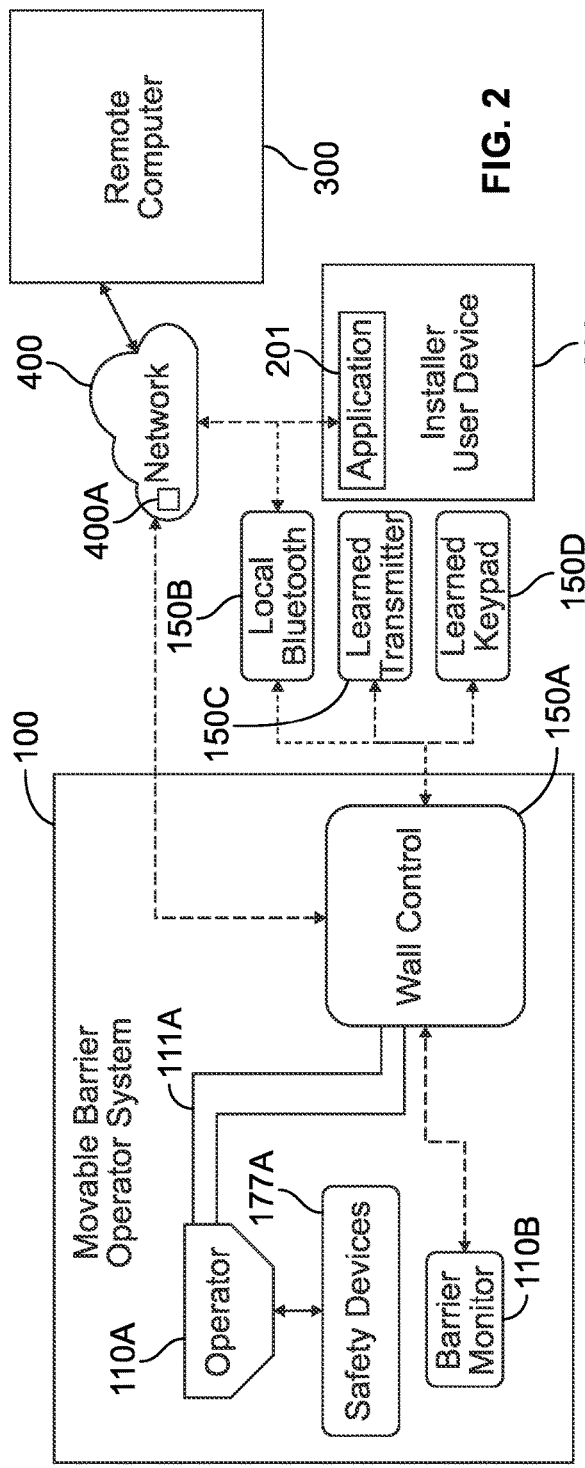
FIG. 2 is a schematic diagram of an embodiment of components of the system of FIG. 1 showing the communications between the remote computer, one of the user devices, and the movable barrier operator system.

With reference to FIG. 2, an embodiment of the components of the system 100 is shown. In the embodiment illustrated in FIG. 2, the movable barrier operator system 100 includes a movable barrier operator 110A with a wired connection 111A to a wall control 150A. The wired connection 111A may be, for example, a two-wire connection, a coaxial cable, an ethernet cable (e.g., Cat 5, Cat 6, Cat 7, etc.), or other physical communication path. The wall control 150A has communication circuitry operable to communicate directly with the base station 400A (e.g., a NodeB or enhanced NodeB (eNB)) of the network 400. The wall control 150A may receive a state change request from the remote computer 300 or an application 201 of the installer user device 200 via the network 400 and communicate a control signal to the movable barrier operator 110A via the wired connection 111A that causes the movable barrier operator 110A to change the state of an associated movable barrier. In this manner, the wall control 150A may facilitate changing the state of the movable barrier even though the movable barrier operator 110A may not include integral or unitary network-communication capability.

The wall control 150A may receive barrier position data from a barrier monitor 110B. The barrier monitor 110B may include, for example, a sensor including a tilt switch, accelerometer, gyroscope, contact closure switch, and/or a hall effect sensor as some examples. The movable barrier operator 110A may communicate with one or more safety devices 177A such as photo eyes, a camera, a force sensor, and/or a torque sensor. The safety devices 177A may detect obstructions.

The communication circuitry of the wall control 150A may additionally facilitate communication via a short range wireless protocol, such as a local Bluetooth (e.g. Bluetooth low energy (BLE)) connection 150B. The local Bluetooth connection 150B may permit the wall control 150A to receive the credential 12 from the installer user device 200 as one example. The communication circuitry of the wall control 150 may also facilitate communication with a transmitter I SOC and/or a keypad 150D that were learned by the movable barrier operator 110A, e.g., before the installation of the wall control 150A.

Returning to FIG. 1A, the movable barrier operator system 100 is configured to receive the credential 12 from a user device, such as the installer user device 200 and store the credential in a data structure 20 contained in a memory of the movable barrier operator system 100. The credential 12 may be transferred to the movable barrier operator system 100 during the installation and/or setup of the movable barrier operator system 100 from the installer user device 200. The credential 12 may serve as a digital key or passcode for controlling the movable barrier operator system 100. For example, when the movable barrier operator system 100 receives a control signal to change the state of the associated movable barrier, the movable barrier operator 110 may change the state of the movable barrier when the control signal includes the credential.

The credential 12 may be, as examples, a code, token, and/or password. The credential 12 may be an alphanumeric value. In one example, the credential 12 is generated randomly. In another example, the credential 12 is generated according to a predetermined algorithm. The credential 12 may be generated by the application 201 of the installer user device 200. The application 201 may be a smartphone application associated with the movable barrier operator system 100 and/or remote computer 300. The credential 12 may be generated via the installer user device 200 and/or via the remote computer 300, such as a remote computer associated with the movable barrier operator system 100 application installed on the installer user device 200. In the example where the credential 12 is generated via the remote computer 300, the remote computer 300 sends the credential 12 to the installer user device 200 and the installer user device 200 stores the credential in memory 204. The installer user device 200 may then be used to send the credential 12 to the movable barrier operator system 100.

Figure 3A:
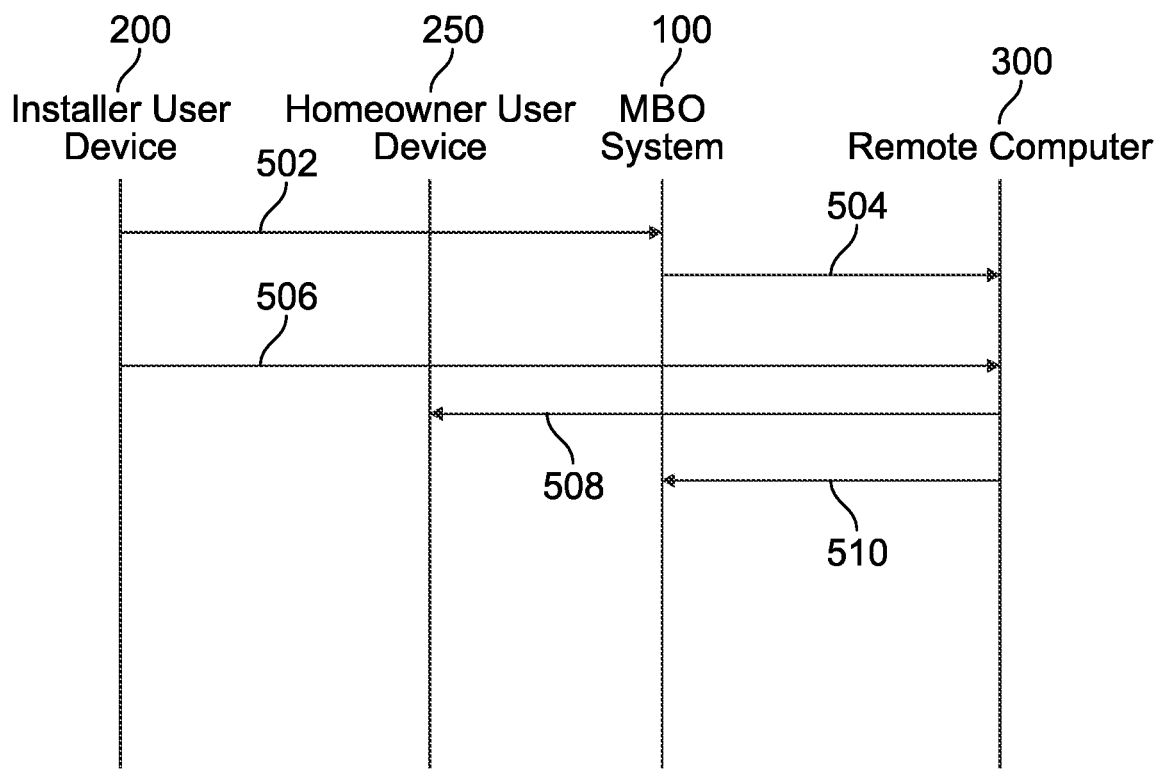
FIGS. 3A and 3B are example flow diagrams showing a credential being transferred between the user device, movable barrier operator system, and remote computer of FIG. 2 and a second user device.

The installer user device 200 may be a smartphone, tablet, smartwatch, laptop, or personal computer as examples. The application 201 may be an application associated with one or more devices of the movable barrier operator system 100, such as, for example, a movable barrier operator 110 or wall control 150, 150A. As shown in FIG. 3A, the credential may be communicated and transferred among the devices of the system 10. The application 201 on the installer user device 200 may be used to communicate 502 the credential to the movable barrier operator system 100. Upon physically installing the movable barrier operator system 100, the installer user device 200 may connect the installer to or communicate with the movable barrier operator system 100 via a direct wireless communication, for example, a Bluetooth communication. Alternatively, or in addition, the installer user device 200 may communicate with the movable barrier operator system 100 via any wireless communication protocol, including wireless fidelity (Wi-Fi), cellular, radio frequency (RF), infrared (IR), Bluetooth (BT), Bluetooth Low Energy (BLE), Zigbee, Z-wave, and near field communication (NFC) as examples. In an embodiment where the installer user device 200 communicates with the movable barrier operator system 100 using a cellular communication protocol, the user device 200 may send a communication to the movable barrier operator system 100 via a cellular base station. The application 201 may instantiate a graphical user interface (GUI) on a user interface of the installer user device 200. The GUI includes virtual button(s) that the installer selects to cause the installer user device 200 to generate and transfer the credential 12 to the movable barrier operator system 100. The GUI of the installer user device 200 may include a touchscreen display.

Regarding FIG. 3A, upon receipt of the credential 12, the movable barrier operator system 100 may store the credential 12. In one embodiment, the movable barrier operator system 100 stores the credential 12 received in memory 114 (see FIG. 5). The credential 12 may be encrypted by the installer user device 200 and the movable barrier operator system 100 may decrypt the credential 12 upon receipt thereof. In one embodiment, the movable barrier operator system 100 stores the credential on remote memory, such as the memory 304 (see FIG. 8) of the remote computer 300 alternatively or in addition to storage of the credential locally in memory 114.

Upon receiving the credential 12 from the installer user device 200, the movable barrier operator system 100 may communicate 504 the credential 12 and a unique identifier of the movable barrier operator system 100 such as device ID 100A to the remote computer 300. This may include wirelessly communicating the credential 12 and the unique identifier to a base station of a wide area wireless network. For example, the movable barrier operator system 100 communicates the credential 12 and unique identifier to a cellular tower or other radio transmitter/receiver used in a mobile telecommunication network including, as examples, 3G, 4G/LTE, 5G/NR, etc. The base station may include evolved Node B (eNB) or next generation eNB (ng-eNB) as examples. As another example the base station is a wireless communication transmitter/receiver node of a wide area wireless network, such as WiMAX, LoRaWAN, or Starlink. In one example, the wide-area communication (enabled by cellular/internet-of-things (IoT) wall control 150A of the movable barrier operator system 100) may be instantiated by: a local hub in communication with the movable barrier operator 110A; and a local or remote gateway device. In particular, the gateway device may be configured to translate or convert communications between a wide-area/cellular protocol and a medium-range communication protocol (e.g., using LoRa or other low-power wireless area network (LPWAN) communication format). Furthermore, the local hub device(s) may be configured to bridge, translate or convert communications between a low-power unitary/integral communication module (e.g., 900 MHZ, Bluetooth, Bluetooth low energy (BLE)) of the movable barrier operator 110A and the gateway device. Accordingly, the gateway device may serve as a connection point for a plurality of local hub devices to access the internet via wide-area/cellular connection. During the construction of a planned community or neighborhood, a builder may employ a gateway device to provide temporary communication access for one or more hub devices in various home garages such that the associated one or more movable barrier operators (e.g., garage door openers) may be monitored and controlled locally or remotely.

The movable barrier operator system 100 may be configured to automatically or autonomously communicate the credential 12 and the unique identifier device ID 100A to the base station of the wide area wireless network upon receipt of the credential 12 from the installer user device 200. The unique identifier of the movable barrier operator system 100 may be a unique product code or indicia such as a serial number (e.g., a globally unique ID) assigned to one or more components of the movable barrier operator system 100 during manufacturing. In one example, the unique identifier is a unique product identifier code of the movable barrier operator 110. In another example, the unique identifier is a unique product identifier code of the wall control 150. Upon receiving the unique identifier and credential 12, the remote computer 300 may then store the unique identifier and the credential 12 of the movable barrier operator system 100 in memory 304. Additionally, the remote computer 300 may determine the user account that generated the credential via the application 201 and associate the movable barrier operator system 100, the credential 12, and a user account of the installer. In this example, the remote computer 300 may include or have access to a database of user accounts. Associating the credential 12 with a user account may allow a user to sign into their user account via the application 201 on any user device 199 and control/monitor the movable barrier operator system 100.

In one example, when the application 201 generates the credential 12, the credential 12 is also communicated to the remote computer 300 from the installer user device 200. The remote computer 300 may store the credential 12 and associate the installer's user account and the credential 12. Once the movable barrier operator system 100 sends the unique identifier and the credential 12, the remote computer 300 may match the credential 12 received from the installer user device 200 and the movable barrier operator system 100 and further associate the installer user device 200 with the movable barrier operator system 100.

The application 201 of the installer user device 200 associated with the movable barrier operator system 100 may be configured to generate a control command, e.g., a state change request, in response to user input at the user interface of the installer user device 200 requesting a change in state of a movable barrier of the movable barrier operator system 100. As one example, when a user presses an "Open" button within the application 201, the application 201 generates a state change request including the credential 12 to transmit to the movable barrier operator system 100. The installer user device 200 may be configured to communicate the state change request to the movable barrier operator system 100 via a direct wireless communication or via an indirect communication such as via the network 400. In one embodiment, the installer user device 200 sends control signals via a cellular network, the internet, and a server computer to the movable barrier operator system 100. As another example, the installer user device 200 may be configured to send the control signal via a Wi-Fi network such as the Wi-Fi network of a home associated with the movable barrier operator system 100. In some embodiments, the state change request may be sent from the installer user device 200 to the movable barrier operator server computer, e.g., remote computer 300, which then communicates the state change request to the movable barrier operator system 100. In embodiments where the movable barrier operator system 100 includes a cellular network interface, the movable barrier operator server computer may be configured to send the state change request to a cellular network which communicates the state change request to the movable barrier operator system 100 via a cellular signal.

In another embodiment, when the installer user device 200 is in close proximity to the movable barrier operator system 100, the installer user device 200 may communicate the state change request to the movable barrier operator system 100 via a direct wireless communication, such as a Bluetooth communication. A determination of whether the installer user device 200 is in close proximity to the movable barrier operator system 100 may be based on the location of the installer user device 200 relative to the location of the movable barrier operator system 100. The installer user device 200 may determine its location using, for example, data from GPS satellites and/or cell phone towers. If the installer user device 200 is outside of a certain range, for example, more than 100 feet away, then the installer user device 200 may be configured to communicate the state change request to the movable barrier operator system 100 via a network connection or a long-range wireless communication protocol as described in the embodiments above. For example, the user device 200 sends the state change request via a Wi-Fi connection to the remote computer 300 of the movable barrier operator system 100. The remote computer 300 may then send the state change request to the movable barrier operator system 100 over a network, e.g., a cellular network.

The movable barrier operator system 100, upon receiving state change request, may then process and respond to the state change request. The movable barrier operator system 100 may determine whether the state change request includes the credential 12. The movable barrier operator system 100 may do this by decrypting the state change request and parsing the state change request received into various portions. The movable barrier operator system 100 may determine the portion of the state change request that includes the credential 12. The movable barrier operator system 100 may compare the credential 12 received with the state change request to the credential 12 saved in the memory 114 of the movable barrier operator system 100. If the credential 12 of the state change request matches the credential 12 stored in memory 114, then the movable barrier operator system 100 may operate in response to the state change request, for example, if the state change request was an "open" command then the movable barrier operator 110 moves the movable barrier of the movable barrier operator system 100 to an open position.

Once the installer has completed installation and/or testing of the movable barrier operator system 100, the installer may transfer the credential 12 to another entity such as a homebuilder manager/foreperson or ultimately to the homeowner. In the example where the installer transfers the credential 12 to the homeowner, the installer may enter the user account information of the homeowner into the application 201, for example, the username, phone number, and/or email address of the homeowner. The application 201 may include a feature for transferring the credential 12. The application 201 may include a virtual button that the installer selects to cause the credential 12 to be transferred to the homeowner's user account. According to the example method of FIG. 3A, once the installer selects to transfer the credential 12 to the homeowner, the installer user device 200 communicates 506 a transfer request (e.g., including the credential 12) to the remote computer 300. The remote computer 300 then communicates 508 the credential 12 to the homeowner user device 250. The remote computer 300 may communicate the credential 12 to the homeowner user device 250 via an application of the user device 250. The remote computer 300 may also communicate 510 information relating to the transfer of the credential 12 to the movable barrier operator system 100. The remote computer 300 may also update the association of the credential 12 with a user account within the memory 304 of the remote computer 300. For example, the remote computer 300 may change the association of the device ID 100A of the movable barrier operator system 100 and the credential 12 to be associated with the homeowner or homeowner's user account as seen by comparing FIGS. 1B and 1D. The remote computer 300 may further remove the association of the movable barrier operator system 100 and the credential 12 with the installer's user account and/or installer user device 200 to prevent the installer user device 200 from being able to control the movable barrier operator system 100.

The application 201 may delete or remove the credential 12 from the installer user device 200 once the credential 12 has been successfully transferred to the homeowner. As one example, the application 201 causes the credential 12 of the installer user device 200 to expire by way of digital rights management access control approaches. In another example, the credential 12 of the installer could be rendered invalid by using public/private key pairs to encrypt or cryptographically sign credentials 12. Upon a request or command to transfer a credential 12 from a first entity to a second entity, the credential 12 may be decrypted using the first entity's private key and subsequently re-encrypted using the second entity's public key and then communicated to and stored in one or more locations (e.g., remote computer 300 and/or movable barrier operator system 100). The remote computer 300 and/or movable barrier operator system 100 may also receive or possess the second entity's public key and/or be notified of the transfer from the first entity to the second entity. Via intentional private/public key mismatch, the installer (first entity) may retain the credential 12 in its originally encrypted form, but, upon transfer, the credential 12 would no longer effect an action because a recipient (e.g., remote computer 300 and/or movable barrier operator system 100) possesses the second entity's private key that would not be usable to decrypt the first entity's originally-encrypted credential.

In another embodiment, rather than deleting the credential 12 from the installer user device 200, upon transferring the credential 12, a new credential 12 is created or derived from the credential 12. For example, once the installer selects to transfer the credential 12 to the homeowner, the credential 12 is sent to the remote computer 300. The remote computer 300 may then create, generate, or derive a new credential 12 and send the new credential 12 to the homeowner user device 200 and the movable barrier operator system 100. The new credential 12 may be derived from the original credential 12 by a proprietary algorithm of the remote computer 300 and/or the movable barrier operator system 100. In yet another embodiment, once the installer selects to transfer the credential 12 to the homeowner, the remote computer 300 removes the association in the table 20 between the installer's user account 22, installer user device 200, and/or the movable barrier operator system 100 and directs the movable barrier operator system 100 to no longer operate in response to state change requests from the installer's user account or installer user device 200 even if the state change request includes the correct credential.

In yet another embodiment, the credential 12 may be transferred using distributed ledger technology e.g. blockchain. For example, each transfer of the credential 12 may be monitored and recorded by nodes of a distributed public database, such as a network of computers. The network of computers may store information about each transaction relating to the credential 12. The network of computers may store the transferee and the transferor with each transaction, for example, digital signatures associated with the installer and the homeowner. Upon the transfer transaction between the installer and the homeowner, the network of computers verifies the details of the transfer. Thus, upon transfer, the credential 12 is associated with the digital signature of the homeowner and is no longer associated with the digital signature of the installer. The movable barrier operator system 100 may be configured to verify that the credential 12 of state change requests received are associated with the correct digital signature the network of computers indicates has possession of the credential 12.

Figure 3B:
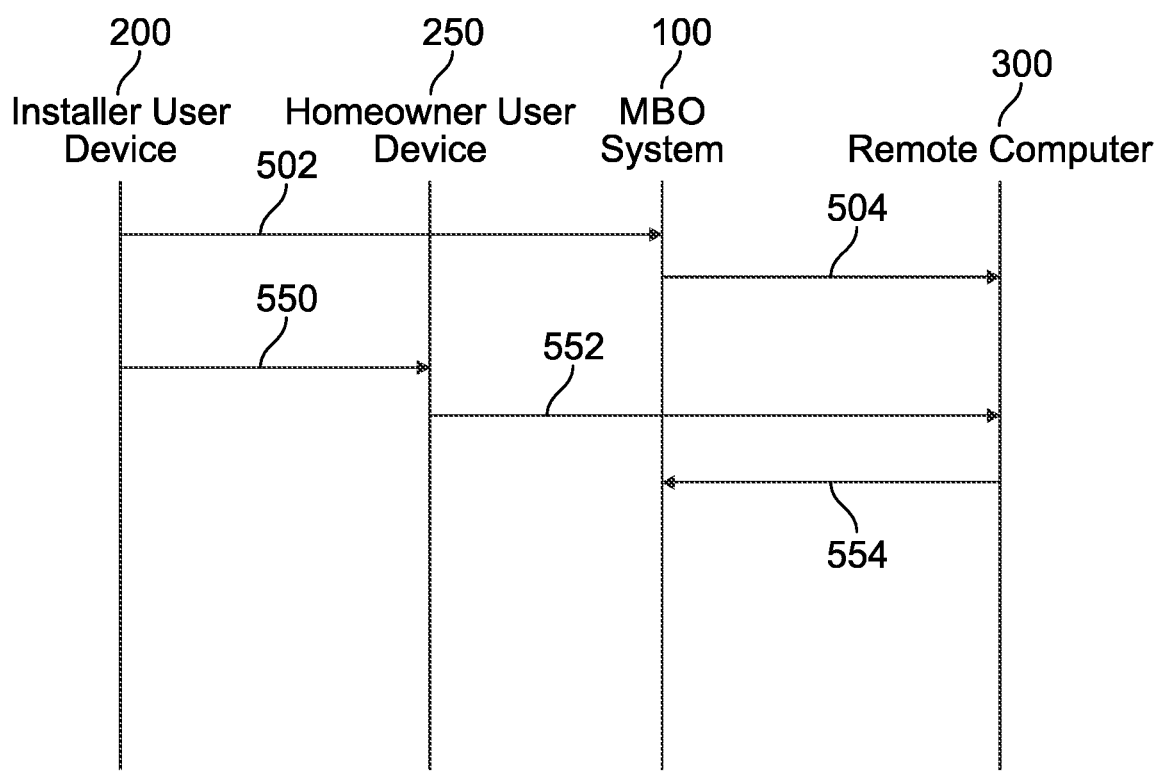

In an alternative embodiment shown in FIG. 3B, when the installer seeks to transfer the credential 12 to the homeowner, the installer uses the installer user device 200 to communicate 550 the credential to the homeowner user device 250 via a direct wireless peer-to-peer connection, such as infrared, Bluetooth or NFC. Once the homeowner user device 250 has received the credential 12, the homeowner user device 250 communicates 552 information relating to the transfer of the credential 12 to the remote computer 300. The information relating to the transfer of the credential 12 may include information that the credential 12 was transferred from the installer to the homeowner, the credential 12 that was received by the homeowner from the installer, or a derivative credential generated by the homeowner user device 250 in response to receiving the credential as some examples. Once the remote computer 300 has received the information relating to the transfer of the credential 12, the remote computer 300 may also communicate 554 information relating to the transfer to movable barrier operator system 100. The movable barrier operator system 100 may be configured to no longer operate in response to a state change request from the installer's user account or user device 200. This may be due to the credential 12 changing or due to the movable barrier operator system 100 being programmed to no longer respond to state change requests associated with the installer's user account or user device 200.

Figure 4:
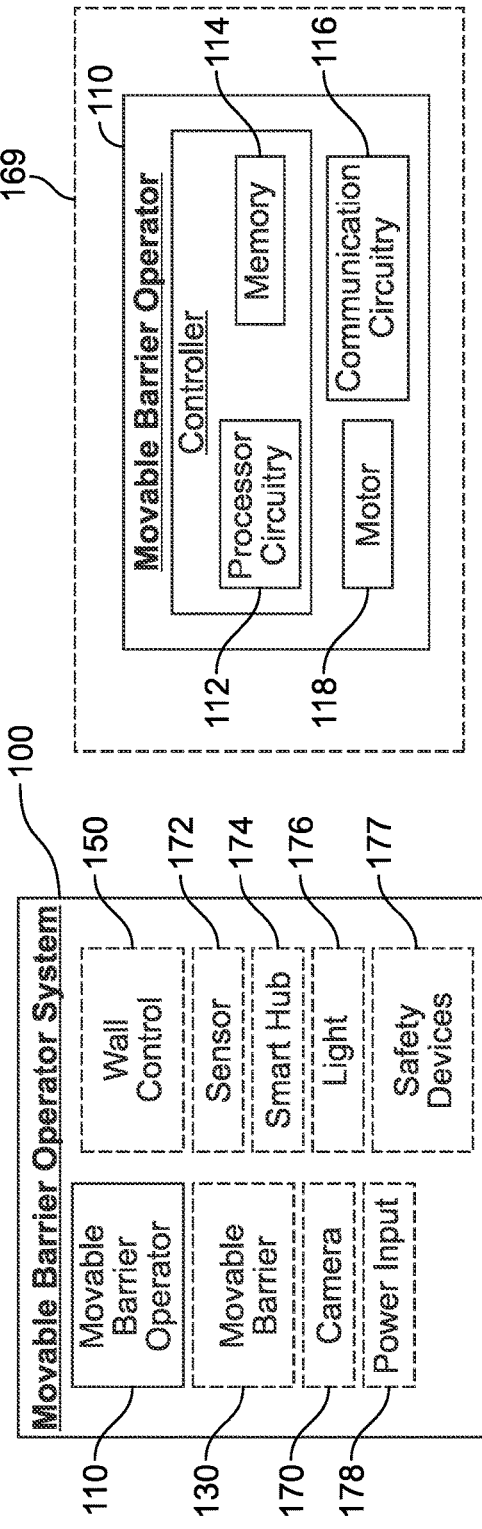
FIG. 4 is an example block diagram of an embodiment of the movable barrier operator system of FIG. 2.

With reference to FIG. 4, the movable barrier operator system 100 includes a movable barrier operator 110 (e.g., a garage door opener, a sliding/swinging gate opener, etc.), and may include a movable barrier 130, wall control 150, camera 170, sensor 172, smart hub 174, light 176, safety device(s) 177, power input 178, and/or other movable barrier operator accessories. In one embodiment, one or more of these components may be network-enabled. The accessories may communicate with the movable barrier operator 110 and/or the wall control 150 such that the accessories are controllable by way of the movable barrier operator 110 and/or wall control 150. The power input 178 may be a power cord or electrical socket for receiving electrical power. The electrical power may be provided from a power source including, as examples, a conventional alternating current wall outlet and/or a battery.

Figure 5:
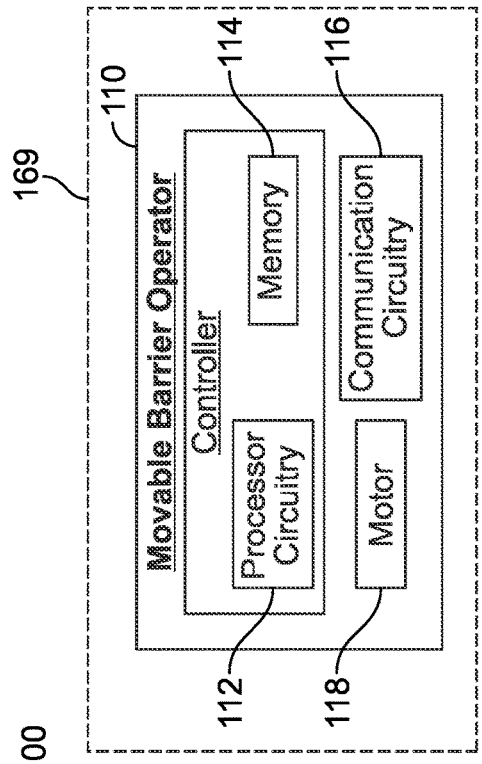
FIG. 5 is an example block diagram of the movable barrier operator of the movable barrier operator system of FIG. 4.

With reference now to FIG. 5, the movable barrier operator 110 may include a processor circuitry 112, memory 114, communication circuitry 116, and a motor 118. The processor circuitry 112 is in communication with the memory 114 and may control the motor 118. The motor 118 may be coupled to a movable barrier 130 as is known in the art such that when the processor circuitry 112 operates the motor 118 the movable barrier 130 is moved. Examples of movable barriers include sectional doors, tilting doors, swinging gates and rolling shutters. The processor circuitry 112 may also communicate with remote devices or server computers via the communication circuitry 116 of the movable barrier operator 110.

The communication circuitry 116 may include a network interface for communicating via the network 400. In some instances the network 400 may be constituted by the internet and a cellular wireless network, however additional wireless networks may be employed, for example, the cellular wireless network in combination with a LPWAN (e.g., LoRa) network and a local, short-range wireless network such as a personal access network (PAN). The communication circuitry 116 may be configured to communicate using one or more communication protocols, for example, Wi-Fi, Cellular, Bluetooth, RF, NFC, Zigbee, Z-wave, and the like. The movable barrier operator 110 may be manufactured or packaged ready to communicate with a cellular network upon receiving electrical power. For example, the movable barrier operator 110 may be programmed at the factory to communicate over a wide area wireless network (e.g., a cellular network), and is packaged in a container 169 such as a box for shipping and/or retail. In this embodiment, once the installer removes the movable barrier operator 110 from the container 169 and connects the movable barrier operator 110 to a power source, the movable barrier operator 110 autonomously connects to a cellular network without the installer entering network information. The movable barrier operator 110 may include instructions stored in memory for connecting to and communicating with the wide area wireless network. As an example, the movable barrier operator 110 may have an assigned phone number (e.g., associated with an installed or integral SIM card) and a cellular network service plan associated with the manufacturer.

Figure 6:
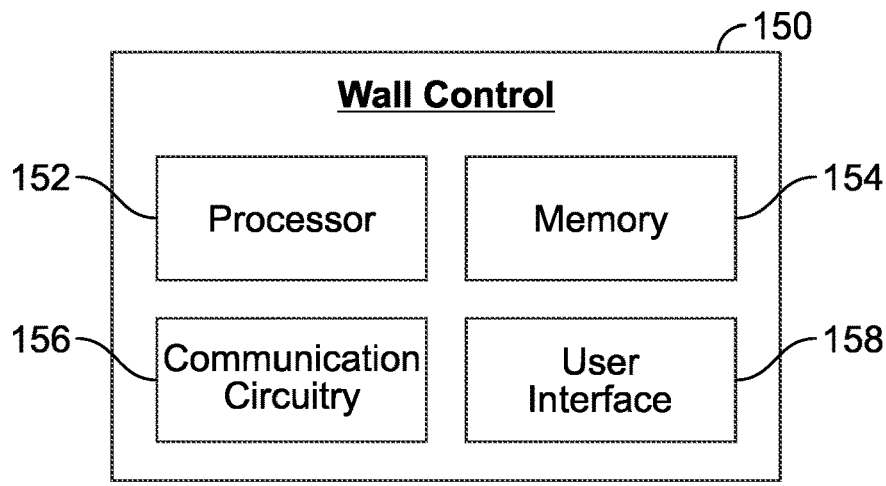
FIG. 6 is an example block diagram of a wall control of the movable barrier operator system of FIG. 4.

In embodiments where the movable barrier operator system 100 includes a wall control 150, the wall control 150 may be a smart wall control, for example, a wall control that is able to communicate over a network. The wall control 150 may be similar to the wall control 150A discussed above. With reference to FIG. 6, the wall control 150 may include a processor 152, memory 154, communication circuitry 156, and a user interface 158. The memory 154 may include instructions for processing control signals and operating a movable barrier operator 110. The processor 152 communicates with the memory 154 and processes the signals received via the communication circuitry 156 and/or the user interface 158. The processor 152 may communicate with other devices, such as the movable barrier operator 110, via the communication circuitry 156. The processor 152 may also determine the location of the wall control 150, for example, by using multilateration (e.g., triangulation) of communication signals with base stations of a wide area wireless network. Additionally or alternatively, the processor 152 may request the location information of the wall control 150 from a remote computer that determines the location of the wall control 150 by multilateration.

The communication circuitry 156 of the wall control 150 may be configured to communicate with remote devices using one or more communication protocols. For example, the communication circuitry 156 may be configured to communicate using Wi-Fi, cellular, Bluetooth, RF, NFC, Zigbee, and/or Z-wave. In one embodiment, the communication circuitry 156 communicates via a cellular network. The wall control 150 may be programmed and packaged ready to communicate with a cellular network upon receiving electrical power. For example, the wall control 150 is setup to communicate over a wide area wireless network (e.g., a cellular network), and is then packaged in a container for shipping and/or retail display. In this embodiment, once the installer removes the wall control 150 from the container and connects the wall control 150 to a power source, the wall control 150 autonomously connects to the cellular network without the installer providing network information to the wall control 150. The wall control 150 may include instructions stored in memory for connecting to and communicating with the wide area wireless network.

The communication circuitry 156 may be configured to communicate with the movable barrier operator 110 via a wired and/or wireless connection. As one example, the communication circuitry 156 may communicate with the movable barrier operator 110 via the homeowner's Wi-Fi network. In another example, the communication circuitry 156 communicates with the movable barrier operator 110 via a Bluetooth connection. In another example, the communication circuitry 156 is configured to communicate with the movable barrier operator 110 via a wired connection, such as a conventional two-wire connection used to connect a conventional contact closure switch of a conventional wall control to a garage door opener. As one example, some prior garage door openers may include a wall control mounted on the wall of garage, e.g., near a door the homeowner enters and/or exits the garage. These conventional wall controls may include a button that a user presses to cause the associated garage door opener to move the garage door. These conventional wall controls may communicate with the garage door opener using the conventional two-wire connection mentioned above. Because the wall control 150 may connect to the existing wired connection, the wall control 150 may be retrofit into a conventional garage door opener system to replace the conventional wall control. The wall control 150 may send signals over the existing wired connection to cause the garage door opener to change the state of the garage door in response to the wall control 150 receiving a state change request via the network 400.

The wall control 150 may include instructions stored in memory to automatically attempt to detect the movable barrier operator 110 type upon the wall control 150 receiving power. The wall control 150 may be programmed to configure itself to communicate with the detected movable barrier operator type. The self-setup may include the wall control 150 sending a plurality of control commands that that are known to control various movable barrier operators 110 and monitoring for movement of the door using a door position sensor.

The wall control 150 may further be configured to control the movable barrier operator 150 based on state change requests received from a user via the user interface 158 of the wall control 150 or via a network. The user interface 158 may include, as an example, a keypad having one or more physical buttons of the wall control 150. As another example, the user interface 158 may include a touchscreen display with one or more virtual buttons. The user interface 158 may include a microphone for receiving voice commands.

The wall control 150 may be powered by a power source such as a battery, an electrical outlet, and/or by connection to another device of the movable barrier operator system 100, such as the movable barrier operator 110. Having power supplied from the movable barrier operator 110 may be desired where the movable barrier operator 110 includes a battery backup power supply system. Thus, even if there is a power outage, the wall control 150 may still function. For example, in embodiments where the wall control 150 receives power from the movable barrier operator 110, when the homeowner's home loses power during a power outage that causes the homeowner's Wi-Fi network to shut off, the wall control 150 may still receive a state change request from a user device 199 via the wide area wireless network and cause the movable barrier operator 110 to change the state of a garage door. When operating on the power supplied by the battery backup of the movable barrier operator 110, the wall control 150 may enter a low power mode that may limit aspects of the functionality of the wall control 150 to conserve power.

The wall control 150 may be configured to communicate a control signal to the movable barrier operator 110 in response to receiving a state change request from a user device via the network 400. For example, the wall control 150 may be configured to receive state change requests from a keypad associated with the movable barrier operator 110, an RF transmitter, a smartphone via direct communication and/or over a network, and a computer via a network such as the Internet. Thus, the wall control 150 may act as a central receiver of state change requests of a variety of types from a variety of user devices 199 and communicate the commands to the movable barrier operator 110. In this way, the wall control 150 may be retrofitted to a movable barrier operator that is not network-enabled and converts the movable barrier operator into a "smart" movable barrier operator. A homeowner may then send state change requests to the movable barrier operator 100 via the wall control 150 remotely, for example, over the internet via a smartphone, tablet computer, and/or PC. The wall control 150 may be associated with an application on a user device 199, such as a smartphone or tablet. The wall control 150 may also be in communication with a door position sensor (e.g. barrier monitor 110B) and may communicate door state information to the remote computer 300, which in turn may communicate door state information to the user devices 199. The smartphone application may send state change requests to the wall control 150 via a server computer, such as remote computer 300. RF transmitters may be learned to the wall control 150 rather than the movable barrier operator 110 which users may find less cumbersome since learning a transmitter to the movable barrier operator often requires the user to climb a ladder to push the "learn" button on the movable barrier operator.

The wall control 150 may be connected to peripheral devices of the movable barrier operator system 100. The wall control 150 may be configured to receive control signals from a user device 199 to control the peripheral device. For example, a user may be able to control a light 176 (e.g., integral worklight or other light fixture) of the movable barrier operator system 100 by requesting a status change via an application of the homeowner user device 250. The wall control 150 may include these peripheral devices of the movable barrier operator system 100 or be in communication with the peripheral devices. For example, the wall control 150 may include a motion sensor and in response to detecting motion, the wall control 150 may be programmed to communicate with the light 176 to turn on the light 176.

The wall control 150 may include features for mounting the wall control 150 to a surface. For example, the wall control 150 may include one or more keyhole slots for hanging the wall control 150 on a fastener e.g. nails or screws of a wall. The wall control 150 may be mounted to a wall or other surface using attachment approaches known in the art including suction cups, fasteners, and/or adhesives.

Figure 7:
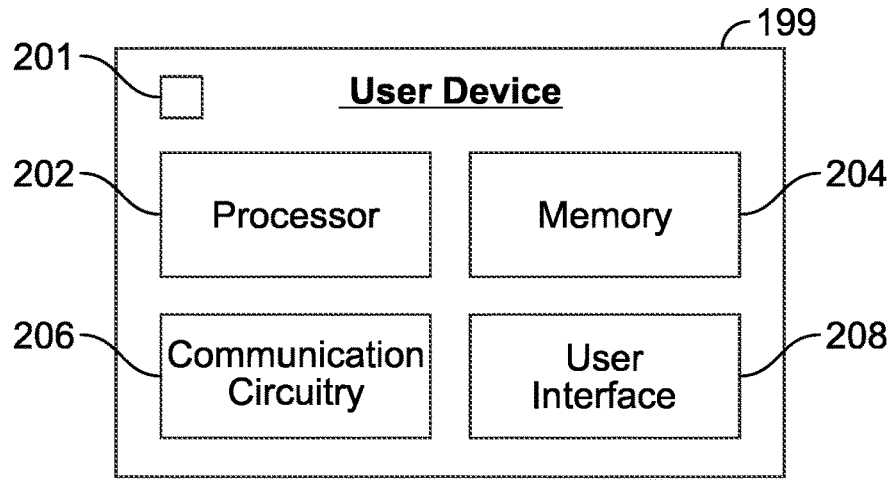
FIG. 7 is an example block diagram of the user device of FIG. 2.

With reference to FIG. 7, the user devices 199 may each include a processor 202, memory 204, communication circuitry 206, and a user interface 208. As examples, the user device 199 may be a smartphone, a tablet, computer, wearable (e.g., smartwatch, glasses, etc.), laptop computer, or PC. The memory 204 may store the credential 12. The processor 202 may communicate with remote devices via the communication circuitry 206. The communication circuitry 206 may be configured to communicate via wireless Wi-Fi, cellular, RF, IR, Bluetooth, BLE, Zigbee, Z-wave and/or NFC. The communication circuitry 206 may communicate via wired protocols such as an ethernet connection. The user device 199 may be configured to store and run one or more applications. The user device 199 may include an application associated with one or more devices of the movable barrier operator system 100, for example, an application configured to control a movable barrier operator 110 via the wall control 150. The application may be, for example, an internet browser or a mobile app as some examples. The application may include a GUI that displays the current status of the one or more movable barrier operators associated with the user account. The application may display a virtual button that may be selected to change the status of the movable barrier. As one example, if the application displays to the user that "Left Garage Door" is "Open," then the application may display a button that a user may select to change the status of "Left Garage Door" to "Closed." The application may be associated with and/or supported by remote computer 300. The installer user device 200, homeowner user device 250, and or other user devices described herein may be similar to the user device 199 described above.

Figure 8:
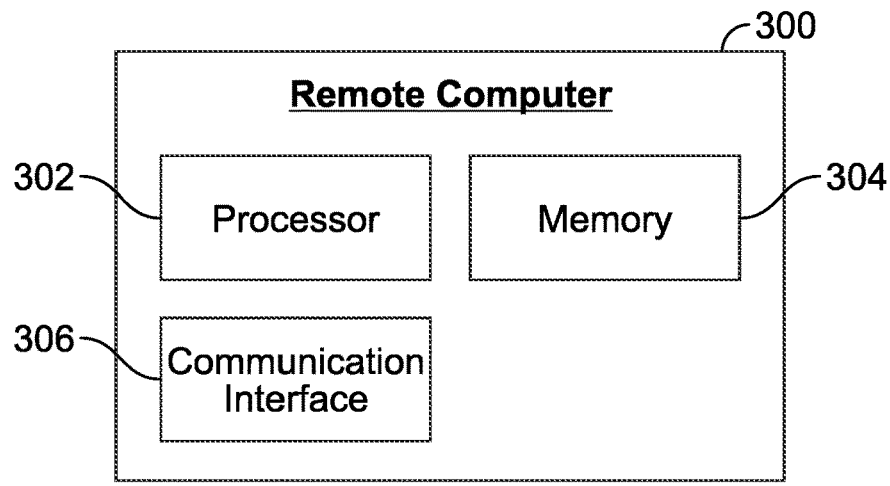
FIG. 8 is an example block diagram of the remote computer of FIG. 2.

With reference now to FIG. 8, the remote computer 300 (e.g., server or cloud computer(s)) associated with the movable barrier operator system 100 includes a processor 302, memory 304, and communication interface 306. The processor 302 communicates with the memory 304. The processor 302 is configured to communicate with remote devices such as user devices 199 and movable barrier operator system 100 via the communication interface 306. The remote computer 300 may include one or more computers such as a middleware or cloud computing infrastructure. In one embodiment, the remote computer 300 communicates with one or more devices over the network 400. As examples, the network 400 may include the Internet. The remote computer 300 may be associated with one or more devices of the movable barrier operator system 100, such as the movable barrier operator 110 or wall control 150. The remote computer 300 may be a server computer of the manufacturer of one or more of the components of the movable barrier operator system 100. The remote computer 300 may be a server computer associated with an application configured to control one or more devices of the movable barrier operator system 100.

The movable barrier operator system 100 of this disclosure may address difficulties encountered in the installation of conventional movable barrier operator systems. For example, when the installer of the movable barrier operator system 100 has completed installation and testing of the system 100, the installer may then transfer the credential 12 to the homeowner. The homeowner then has the credential 12 for controlling the movable barrier operator system 100. Upon transfer of the credential 12, the installer may no longer be able to operate or control the movable barrier operator system 100. In examples where the movable barrier operator system 100 is a garage door opener system, upon transfer of the credential 12, the installer no longer has access to one or more of the homeowner's garage and possibly the homeowner's house.

As explained above, the installer may lose access rights to control the movable barrier operator system 100 upon transfer of the credential 12 in a number of embodiments. In one embodiment, the credential 12 is a credential that can only be associated with one user account or user device at a time. In this embodiment, the transfer of the credential 12 may be made through the remote computer 300. The remote computer 300 may facilitate the secure transfer of the credential 12 to the homeowner while ensuring that the installer's device or user account no longer includes a copy of the credential 12. In the example where distributed ledger technology is used, remote computer 300 may be understood to comprise a plurality of computers on a network to facilitate the transaction.

In one embodiment, the credential 12 stored on the movable barrier operator system 100 may be stored in an encrypted form. When the credential 12 is transferred to the homeowner user device 250, the remote computer 300 is notified of the transfer of the credential 12. The remote computer 300 may then send a new encryption algorithm to the movable barrier operator system 100 to apply to the credential 12. The remote computer 300 may also send the encryption algorithm and/or the encrypted credential to the homeowner user device 250 or user account. When the homeowner sends a state change request, the state change request includes the encrypted credential 12 that the movable barrier operator system 100 compares to the encrypted credential 12 stored in memory 114. If the encrypted credential 12 matches the encrypted credential 12 stored on the movable barrier operator system 100, the movable barrier operator system 100 may respond to the control signal.

In yet another embodiment, when the installer user device 200 transfers the credential 12 to a homeowner user device 250, a new credential is created. The new credential 12 may be derived from the original credential 12 using an algorithm. The new credential 12 may be generated by the remote computer 300 or may be generated by the homeowner user device 250. The movable barrier operator system 100 is notified of the transfer of the credential 12 from the installer user device 200 to the homeowner user device 250 and is notified of the new credential 12. The remote computer 300 may send the movable barrier operator system 100 the new credential 12 or may send an algorithm for generating the new credential 12 based on the old credential 12. In another example, the movable barrier operator system 100 is simply notified of the transfer of the credential 12 and the movable barrier operator system 100 applies an algorithm to the credential 12 to generate, provide or otherwise obtain the new credential 12. Thus, the movable barrier operator system 100 will no longer respond to state change requests including the old credential 12 and will only respond to state change requests with the new credential 12, e.g., those from the homeowner user device 250 that contain the new credential 12.

While the transfer of the credential 12 has been described above as between the installer of the movable barrier operator system 100 and the homeowner, those of skill in the art will appreciate that the credential 12 may be transferred between any two entities or user accounts, e.g., from one homeowner to another homeowner. This example may be utilized when the property including the movable barrier operator system 100 is sold from one homeowner to a new owner. In these situations, the seller may transfer the credential 12 to the buyer according to any of the foregoing description regarding the installer transferring the credential to the homeowner.

As another example, the system 10 enables a builder to remotely control the movable barrier operator system 100 of homes they are building. For example, a builder may be building many homes concurrently, for example, a subdivision or neighborhood of homes. Problems may arise when garage doors of partially built homes are left open overnight. Construction workers may leave tools and equipment in the partially built homes during the day or overnight for work the next day or at a later time. Leaving a garage door open leaves the home unsecure and subject to unpermitted entry, theft, and/or vandalism. The development of Wi-Fi enabled movable barrier operator systems do not always address this problem because often a Wi-Fi network may not be setup at the early stages of the development and construction of homes. These issues may be addressed by the system 10.

For example, once an installer installs a movable barrier operator system 100, the installer operates the installer user device 200 to transfer the credential 12 to the builder user device 34. The builder now has control over the movable barrier operator system 100, for example, via an application on the builder user device 34. The movable barrier operator system 100 includes a cellular connection that automatically connects to a cellular network without the builder or installer having to enter in network information or setup a local network, such as a Wi-Fi network. In some instances, a builder may employ a cellular-LoRa gateway and a plurality of in-garage LoRa-Bluetooth hubs associated with respective movable barrier operator systems 100. In this example, the cellular-LoRa gateway may include a cellular connection that automatically connects to a cellular network without the builder or installer having to enter network information (or minimal human interaction). The LoRa-Bluetooth hubs associated with the movable barrier operator systems 100 may be configured to communicate with the cellular-LoRa gateway and one or more of the movable barrier operator systems 100.

The builder may associate many homes and movable barrier operator systems with the builder's user account. As an example, the builder may upload a map of the subdivision via the builder user device 34 to the remote computer 300. The remote computer 300 may be configured to create a listing of each lot in the subdivision which the builder may associate with a movable barrier operator system 100. Alternatively, the builder may select to add a house or building to their account that they wish to monitor and/or control the security status of The user may associate a street address or other identifier with the home. The builder may then review the status of each movable barrier operator system 100 associated with the builder's user account, for example, using the application associated with the movable barrier operator systems 100 and instantiated on the builder user device 34. The application may present a dashboard display such that the builder may visually identify or determine whether any of the garage doors of the homes under construction have been left open. In the example where a subdivision map has been uploaded, the status of each movable barrier operator system 100 may be indicated on the subdivision map. If a garage door has been left open, the builder may close the garage door via the application. The builder user device 34 may then send the state change request to the movable barrier operator system 100 via the cellular network to which the movable barrier operator system 100 is connected (e.g., via a cellular-LoRa gateway and LoRa-Bluetooth hub). The builder user device 34 may alternatively send the control signal to the remote computer 300 associated with the movable barrier operator system 100, which then sends the state change request to the movable barrier operator system 100 via the cellular network. Once the movable barrier operator system 100 verifies the state change request includes the correct credential 12, the movable barrier operator system 100 closes the garage door.

The builder user device 34 may also be configured to automatically review the status of each garage door and notify the builder when a garage door has been left open for a period of time, such as via a notification on the builder user device 34 or via an email as examples. In another example, the builder user device 34 notifies the builder of any garage doors that are still open after a certain predetermined time, e.g., 6 PM. In another example, the builder user device 34 or associated remote computer 300 is configured to automatically close any garage doors that are left open beyond a predetermined time, such as time set by the builder.

In another embodiment, the builder may program or schedule the security status of the movable barrier operator systems 100. The builder may schedule the movable barrier operator systems 100 be opened and/or unlocked at a set time (e.g., 7 AM) and be closed and/or locked after a set time (e.g., 4 PM). The builder may also configure the movable barrier operator systems 100 to be closed and/or locked on certain days, e.g., the weekend. The builder may program or configure the state and/or security status of the movable barrier operator systems 100 via an application of the builder user device 34. Additionally or alternatively, the builder (e.g., general contractor) may grant sub-contractors (e.g., plumbers, electricians, etc.) access to homes at certain times (e.g., Monday from 8 AM-5 PM), for example, via an application of the builder user device 34. When a builder grants a sub-contractor access, the sub-contractor may be notified by email or an application on their user device of their access rights. The sub-contractor may be able to control the movable barrier operator system 100 via the application during the scheduled time. Additionally or alternatively, the sub-contractor may be provided with a PIN code that they may enter into a movable barrier operator (e.g., keypad of a movable barrier operator outside of the garage or a smart lock with a keypad) to access the home.

Once the builder sells a home to a buyer/homeowner, the builder may transfer the credential 12 to the homeowner. In accordance with the above discussion regarding the transfer of the credential 12, the movable barrier operator system 100 of the home is then configured to respond to state change requests from the homeowner user device 250 and no longer responds to control commands from the builder user device 34.

In another aspect of the present disclosure, a user account including or associated with the credential 12 may have the authority to generate sub-rights. For example, the homeowner may choose to grant sub-rights to others to allow them to operate the movable barrier operator system 100. This may be desired when more than one person lives in the home associated with the movable barrier operator system 100. As an example, the movable barrier operator system 100 may be a garage door opener system. The homeowner may then give sub-rights to other users to operate the garage door opener. For example, sub-rights to control the movable barrier operator system 100 may be given to the homeowner's spouse and/or children to enable these other users to open and close the garage door via the application of the movable barrier operator system 100. In another example, the homeowner may grant sub-rights to a service provider such as an electrician, plumber, dog walker, delivery associate, realtor etc. The homeowner may also grant access rights to guests, e.g., AirBnb guests. This may be desirable when the homeowner is not present to let the service provider or guest into their home.

The homeowner may be able to adjust the type or amount of access rights given to others. In one embodiment, the homeowner may set a time period that a service provider may operate the movable barrier operator system 100. For example, the homeowner may grant their dog walker sub-rights to control the movable barrier operator system 100 during the hours of 8 AM to 5 PM. If the user device 199 of the dog walker sends a state change request to the movable barrier operator system 100 via the application during those hours, the movable barrier operator system 100 may change the state of the movable barrier. However, if the dog walker user device 199 sends a state change request outside of that time period, the movable barrier operator system 100 will not respond. In another example, the homeowner may require that their service provider be within a certain distance of the movable barrier operator system 100 to operate the movable barrier operator system 100. This prohibits the service provider from being able to control the status of the movable barrier operator system 100 when they are not present at the homeowner's home.

Sub-rights and their limitations may be created on a user account platform by a user having administrative privileges such as via an application of the homeowner user device 250. The user, such as a homeowner, may then select the rights they wish to grant to other user accounts, such as their spouse, children, and/or service providers as examples. In one embodiment, the user accounts that are granted sub-rights may be given a copy of the credential 12 that expires after a period of time passes, e.g., a year. In another embodiment, the user accounts with sub-rights are given a derivative of the credential 12 such as a new code or token. The sub-right grantees' user devices 199 may transmit state change requests to the movable barrier operator system 100 including the credential received from the homeowner's user account. The homeowner's user account granting the sub-rights may store or be associated with a database of sub-rights granted to others and stored in the remote computer 300. The remote computer 300 may notify the movable barrier operator system 100 of the credential and conditions in which to actuate in response to.

If the credential or sub-rights are granted to another that does not have a user account, such as a user account of a smartphone application associated with the movable barrier operator system 100, the homeowner's user account may prompt the homeowner to enter the grantee's cellular phone number or email address. The grantee may then receive an SMS text or an email indicating the credential has been transferred to them or that sub-rights have been granted prompting them to create a user account to retrieve their rights. The SMS text or email may include a reference (e.g., hyperlink) that prompts the transferee/grantee to create a user account that will be associated with the credential or sub-rights granted by the homeowner.

In another aspect of the present disclosure, credentialing a movable barrier operator system 100 facilitates transfer of control of a movable barrier operator system 100 when an owner sells their home. In prior systems, when a homeowner sold their home, the homeowner may still be able to control the movable barrier operator system 100 using an application associated with the movable barrier operator system 100 due to the homeowner's user account still being associated with the movable barrier operator system 100. Using the system 10, when the homeowner sells their home including the movable barrier operator system 100, the homeowner also transfers the credential 12 to the buyer in order for the buyer's user device 199 to be able to control the movable barrier operator 110. Thus, the homeowner will no longer be able to control the movable barrier operator 110.

Figure 9:
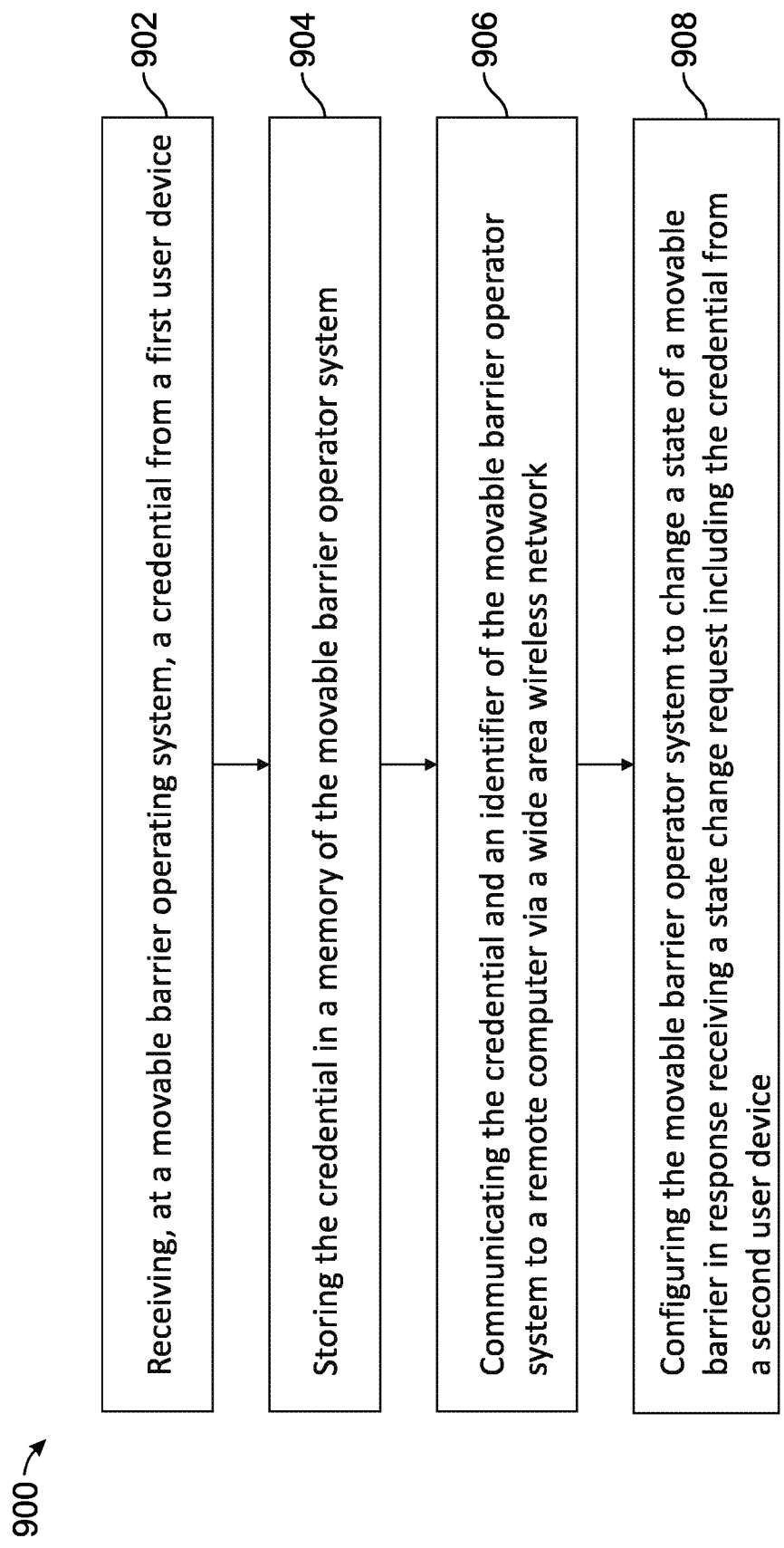
FIG. 9 is a flow chart of an example method of operation of the movable barrier operator system of FIG. 2.

A method 900 for configuring a movable barrier operator system 100 will now be described with reference to FIG. 9. Initially the movable barrier operator system 100 receives 902 a credential 12 from a first user device such as the installer user device 200. The installer user device 200 may be associated with a first user account. The credential 12 may be generated by the installer user device 200. The movable barrier operator system 100 may receive the credential 12 from the first user device via a direct wireless signal, such as Bluetooth or NFC. In another embodiment, the movable barrier operator system 100 may receive the credential indirectly such as via a local Wi-Fi network. The movable barrier operator system 100 then stores 904 the credential 12 in the memory of the movable barrier operator system 100.

In response to receiving the credential 12 from the installer user device 200, the movable barrier operator system 100 communicates 906 the credential 12 and an identifier of the movable barrier operator system 100 to the remote computer 300. As one example, the identifier of the movable barrier operator system 100 may be a unique ID (e.g., serial number) assigned to the movable barrier operator 110 of the movable barrier operator system 100. In another example, the identifier is a unique ID (e.g., an identifier stored on a SIM or universal integrated circuit card (UICC)) of the wall control 150 component of the movable barrier operator system 100. The movable barrier operator system 100 may communicate with the remote computer 300 via the network 400. In one embodiment, the movable barrier operator system 100 communicates with the remote computer 300 via a wide area wireless network interface of the movable barrier operator system 100 to register the movable barrier operator system 100 with the remote computer 300. As one example, the wide area wireless network is a cellular network. In another example the wide area wireless network is a WiMAX network. Once the remote computer 300 has received the credential 12 and identifier from the movable barrier operator system 100, the remote computer 300 may associate the movable barrier operator system 100 with the credential 12 and the user account of the installer user device 200.

Once the movable barrier operator system 100 has been registered with the remote computer 300, the movable barrier operator system 100 may be configured 908 to change the state of the movable barrier 130 associated with the movable barrier operator system 100 in response to receiving a state change request from a user device 199 that includes the credential 12. In one example, the movable barrier operator system 100 may change the state of the movable barrier 130 in response to receiving the credential 12 and a state change request from a second user device, such as homeowner user device 250, associated with a second user account of the movable barrier operator system 100 application. The second user device may have received the credential 12 from the user device 199 that originally assigned the credential 12 to the movable barrier operator system 100, such as the installer user device 200. As another embodiment, the movable barrier operator system 100 is further configured to change the state of the movable barrier 130 in response to receiving state change requests from a second user device, such as the homeowner user device 250, including a credential 12 that is a derivative of the credential 12 received from the first user device, e.g., the installer user device 200. The homeowner user device 250 may receive the credential 12 from the installer user device 200. In some embodiments, when an installer user device 200 transfers a credential 12 to the homeowner user device 250, the remote computer 300 is notified of the transfer of the credential 12. The remote computer 300 may then notify the movable barrier operator system 100 that the credential 12 has been transferred and the movable barrier operator system 100 responsively configures to no longer change the state of the movable barrier 130 in response to receiving signals from the installer user device 200. In some examples, the movable barrier operator system 100 will no longer change the state of the movable barrier 130 even in response to receiving signals from the installer user device 200 containing the credential 12 because the credential 12 is no longer associated with the installer's user account.

Figure 10:
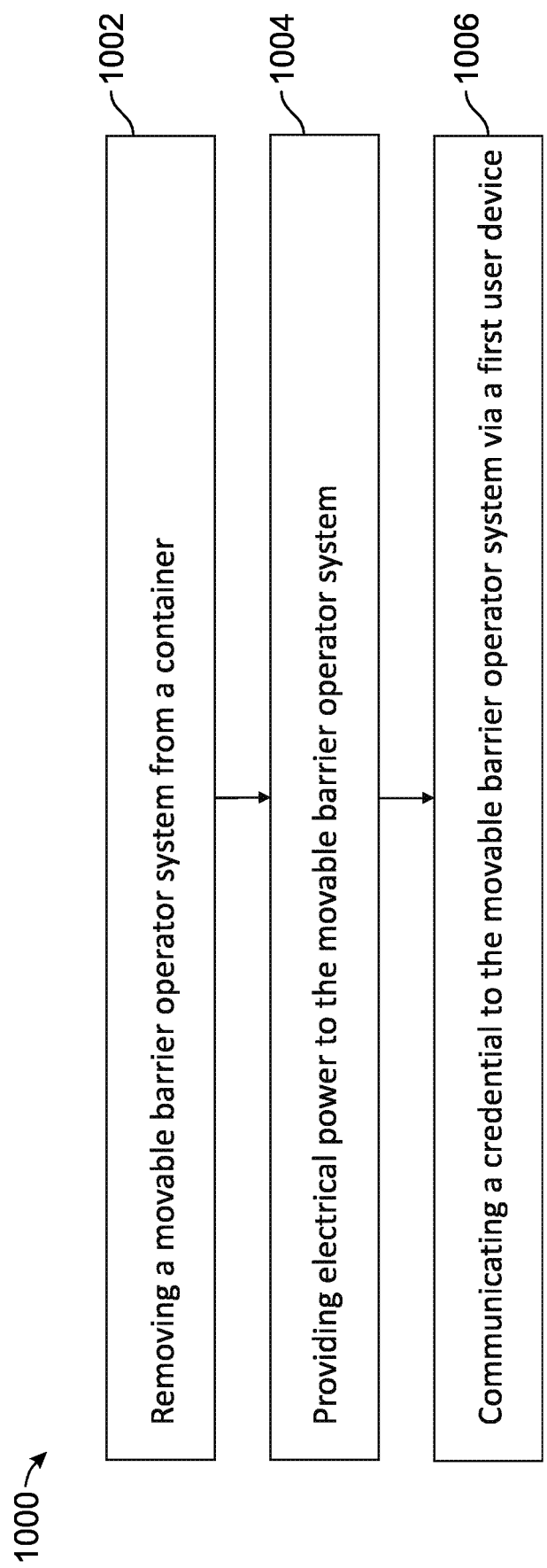
FIG. 10 is a flow chart of an example method of installing the movable barrier operator system of FIG. 2.

With reference to FIG. 10, a method 1000 of installing the movable barrier operator system 100 will now be presented. Initially, the installer removes 1002 the movable barrier operator system 100 or a component thereof from a container (e.g. container 169). The component of the movable barrier operator system 100 may be for example, the wall control 150 or the movable barrier operator 110. Before being packaged in the container, the movable barrier operator system 100 is preconfigured to communicate via a wide area wireless network. For example, the movable barrier operator system 100 is configured to interface with a remote computer 300 via a cellular network interface of the movable barrier operator system 100. This may involve programming the movable barrier operator system 100 to include a cellular phone number or identification number that is associated with a cellular network. The installer may optionally remove the current or existing wall control from the wall and disconnect a wired connection.

The installer then provides 1004 electrical power from the power source to the movable barrier operator system 100 via the wired connection. Providing 1004 may include the installer connecting the movable barrier operator system 100 component to a power source, which may include connecting an end of a first wire connected to a power source to a first terminal of the movable barrier operator system 100 component. The installer may also connect a second wire connected to the power source to a second terminal of the movable barrier operator system 100 component. In the example where the component is the wall control 150, the power source may be the movable barrier operator 110. Providing electrical power may include completing a circuit by, for example, closing a breaker to restore power flow to the first and second wires. Upon receiving electrical power, the component of movable barrier operator system 100 may begin communicating via the wide area wireless network. For example, the movable barrier operator system 100 may communicate with the remote computer 300. Since the movable barrier operator system 100 was configured to interface via the wide area wireless network before packaging, the movable barrier operator system 100 autonomously begins communication over the network without the installer entering any network information into the movable barrier operator system 100 or otherwise connecting the movable barrier operator system 100 to the network. The autonomous connecting may include minimal human interaction, such as the movable barrier operator system 100 requesting permission from the installer user device 200 to proceed. In examples where the installed movable barrier operator system 100 includes wall control 150, the wall control 150 may further automatically detect the type of movable barrier operator 110 of the movable barrier operator system 100 and configure the wall control 150 to control the movable barrier operator 110.

In examples where the wall control 150 is installed, the method 1000 may include the installer mounting the wall control 150 to a surface. Mounting the wall control 150 may include securing the wall control 150 to a wall or other surface using fasteners, such as nails or screws. In another example, the installer fastens screws to the wall and attaches the wall control 150 to the screws using the keyhole slots on an underside of the wall control 150.

In examples where the installer installs the movable barrier operator 110, the method 1000 may include the installer mounting the movable barrier operator 110 by installing a support bracket to the wall or ceiling of a garage and securing the movable barrier operator 110 to the bracket.

The method 1000 further includes communicating 1006 a credential to the movable barrier operator system 100 via the installer user device 200. The communicating 1000 may include sending the credential to the movable barrier operator system 100 using a direct wireless connection such as a Bluetooth or NFC communication protocol. In another example, the installer sends the credential to the movable barrier operator system 100 using a cellular network. Upon receipt of the credential 12, the movable barrier operator system 100 may be configured to communicate the credential 12 received from the installer to the remote computer 300 associated with the movable barrier operator system 100. The movable barrier operator system 100 may be configured to communicate the credential 12 and a unique identifier of the movable barrier operator system 100 to a remote computer, such as remote computer 300, by autonomously wirelessly communicating the credential and the identifier to the base station of the wide area wireless network 400A. The remote computer 300 may then associate the movable barrier operator system 100 with the credential 12 and a first user account. The movable barrier operator system 100 may then operate in response to control signals including the credential.

The present disclosure often uses examples involving homes and garages, however, these examples are used herein for illustrative purposes only of the application of the teachings disclosed herein. For example, the movable barrier operator system 100 may be installed in a commercial or industrial facility, such as a warehouse or factory as examples. Also, the movable barrier operator system 100 may control a gate or a passageway door.

Figure 11B:
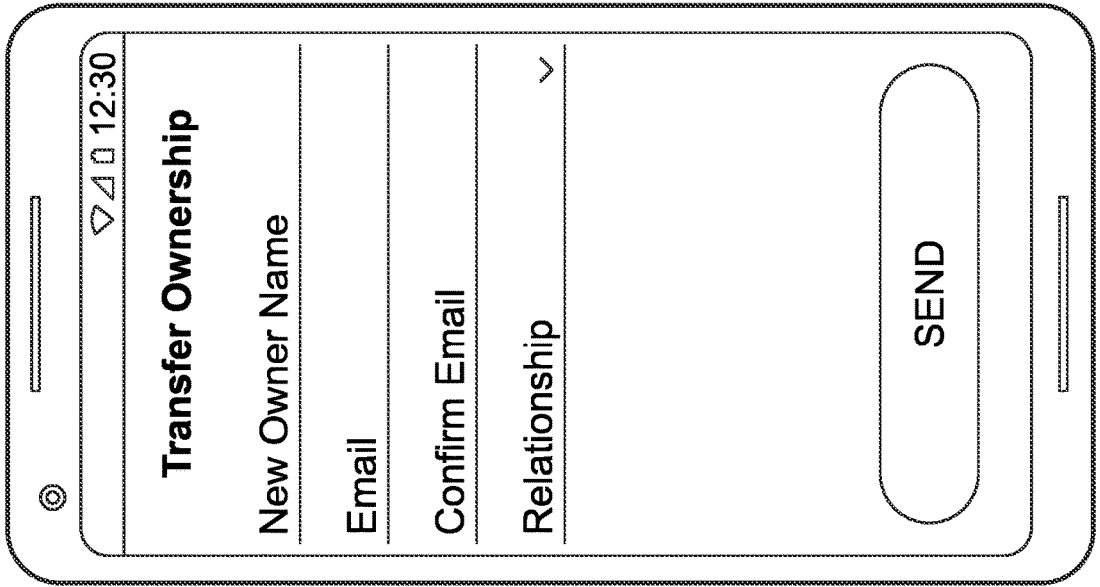
FIGS. 11A-Dare illustrations of an example graphical user interface for transferring credential for controlling a movable barrier operator system.
Figure 11A:
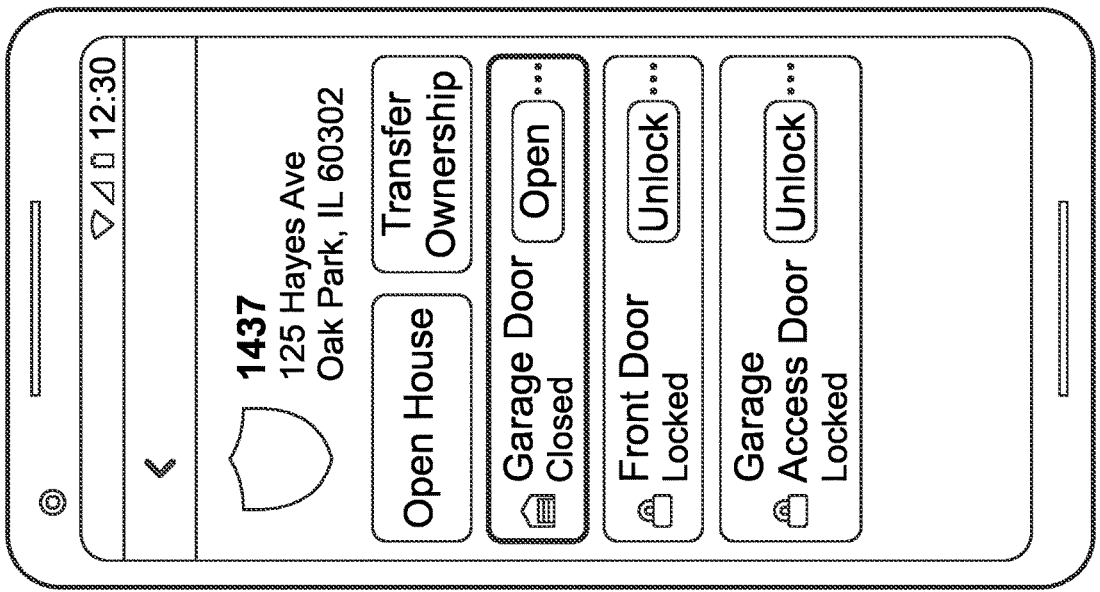
Figure 11D:
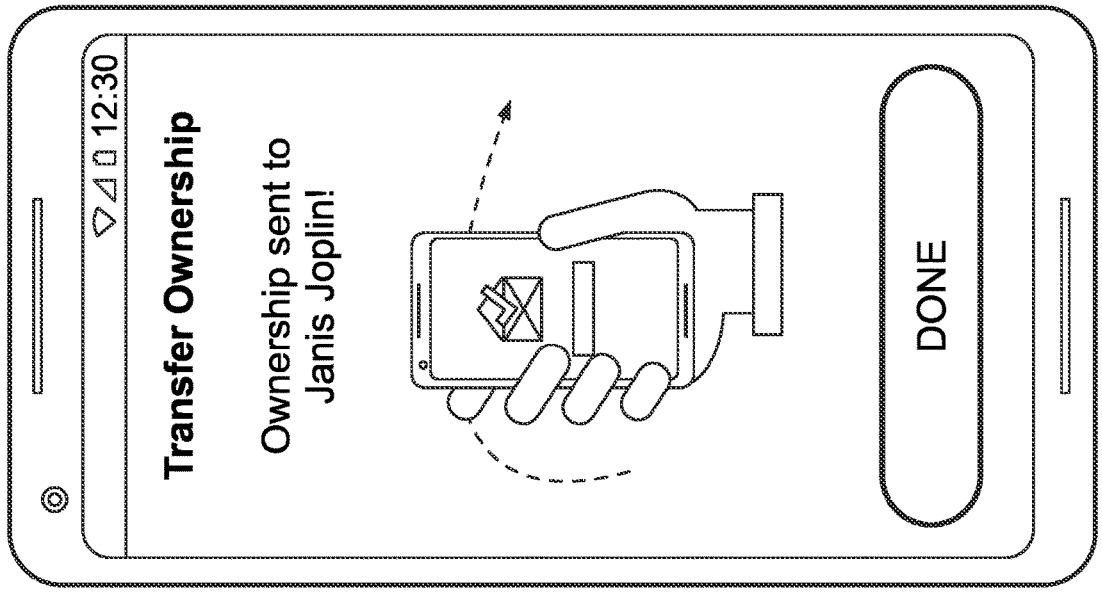
Figure 11C:
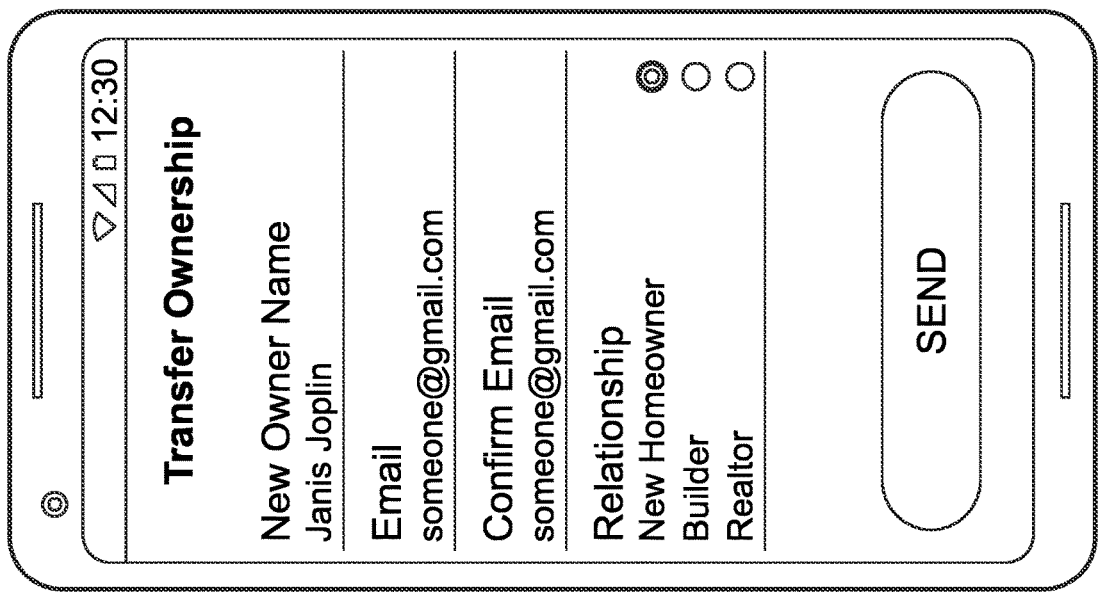

With reference to FIGS. 11A-D, illustrations of an example graphical user interface (GUI) for transferring credential for controlling a movable barrier operator system are shown. FIG. 11A illustrates the user interface presented to a first owner of a movable barrier operator credential which includes a list of sensors and devices associated with the account and an option to transfer ownership. When the "transfer ownership icon" is selected, in FIG. 11B, the GUI prompts for the transferee's information including name, email address, and relationship. In some embodiments, if more than one movable barrier operator are associated with the first owner, the GUI may also prompt the first owner to select from among the movable barrier operators. In FIG. 11C, information associated with the transferee is entered. The GUI may provide options to indicate the relationship (i.e. new homeowner, builder, realtor). In some embodiments, the relationship select may determine the administrative rights of the transferee (e.g. further transfers, add secondary users, etc.). In FIG. 11D, confirmation of the transfer ownership request is provided.

Figure 12B:
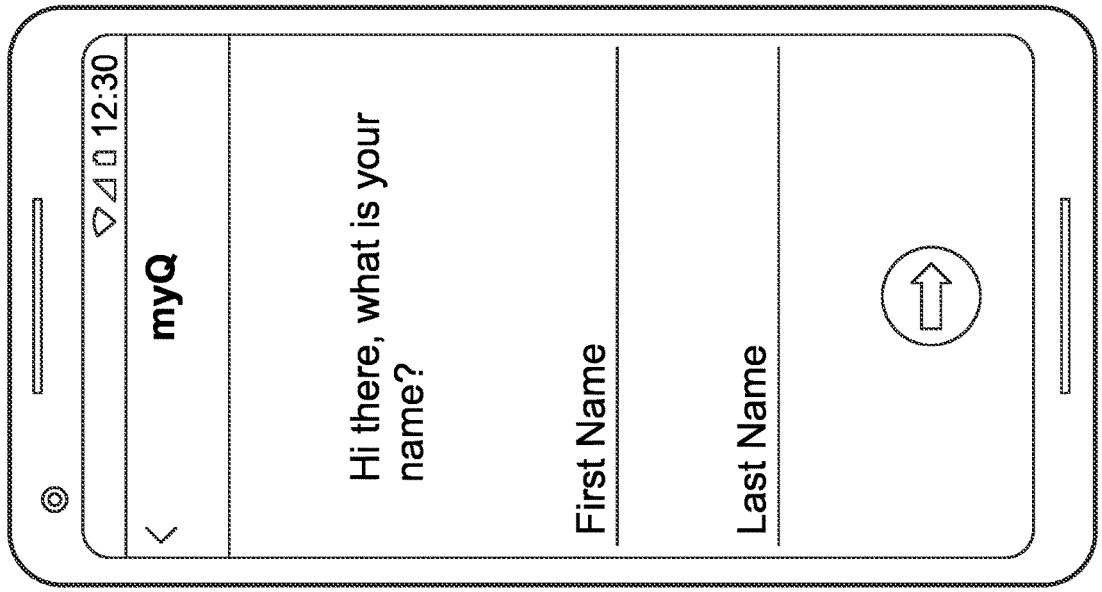
FIGS. 12A-12C and 13A-13C are illustrations of an example graphical user interface for receiving a transfer of credential for accessing a movable barrier operator system.
Figure 12A:
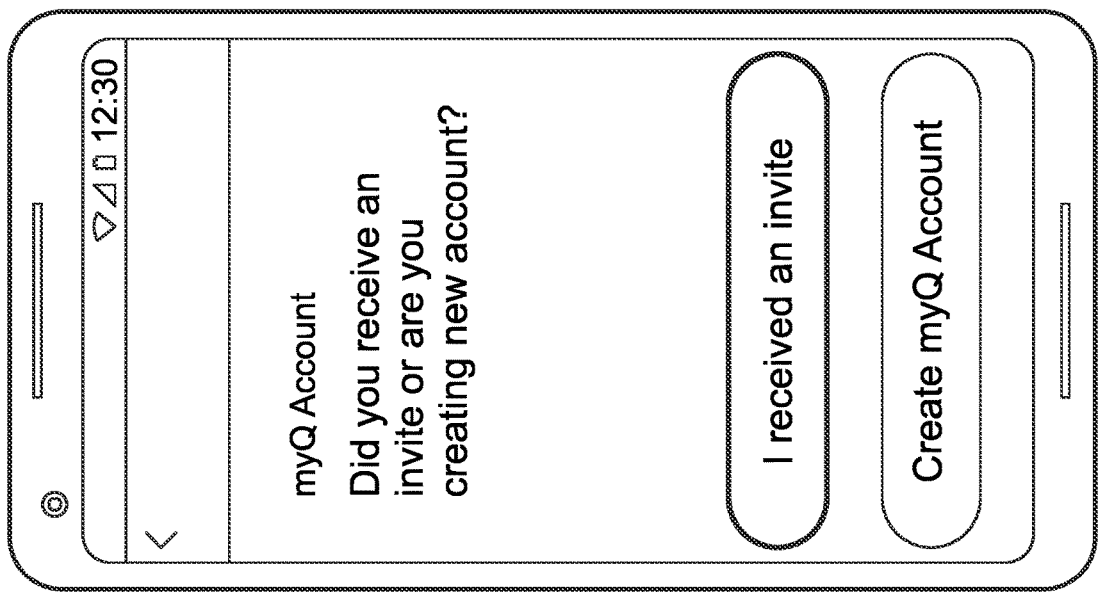
Figure 13A:
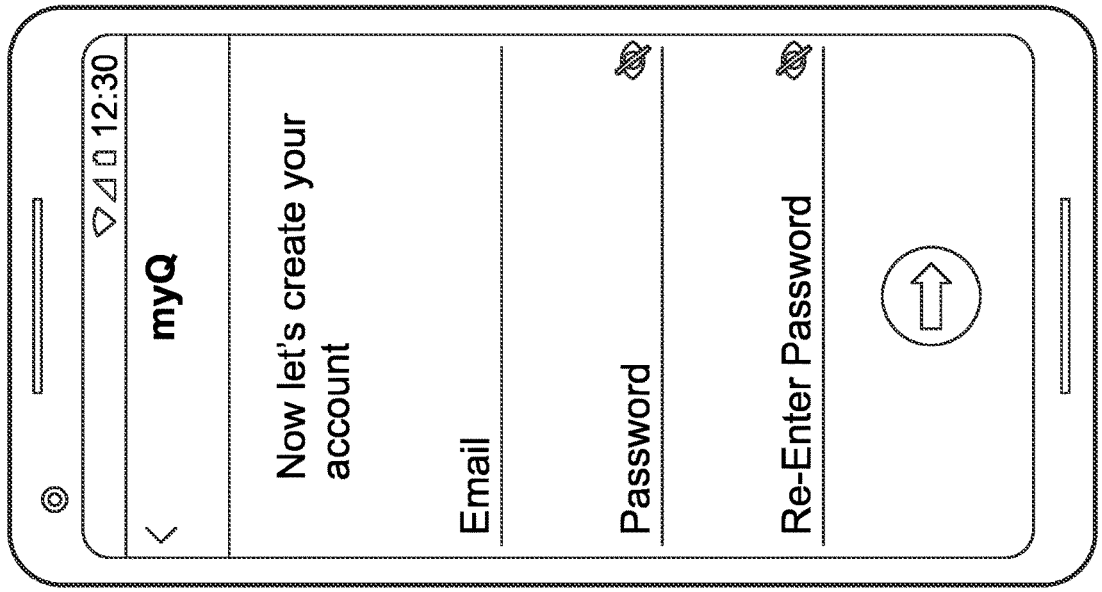
Figure 12C:
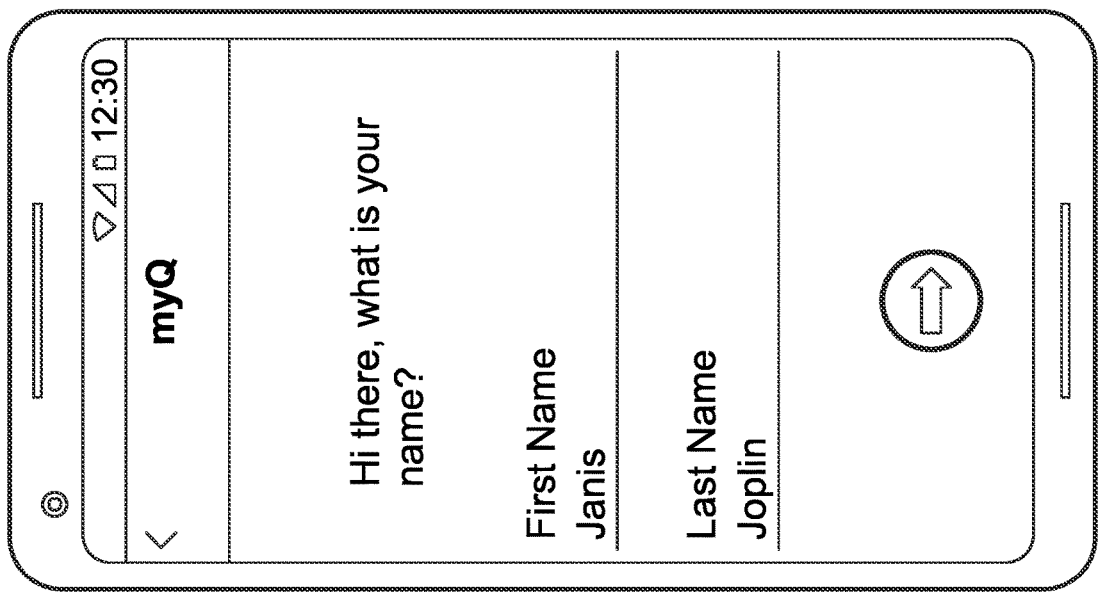
Figure 13C:
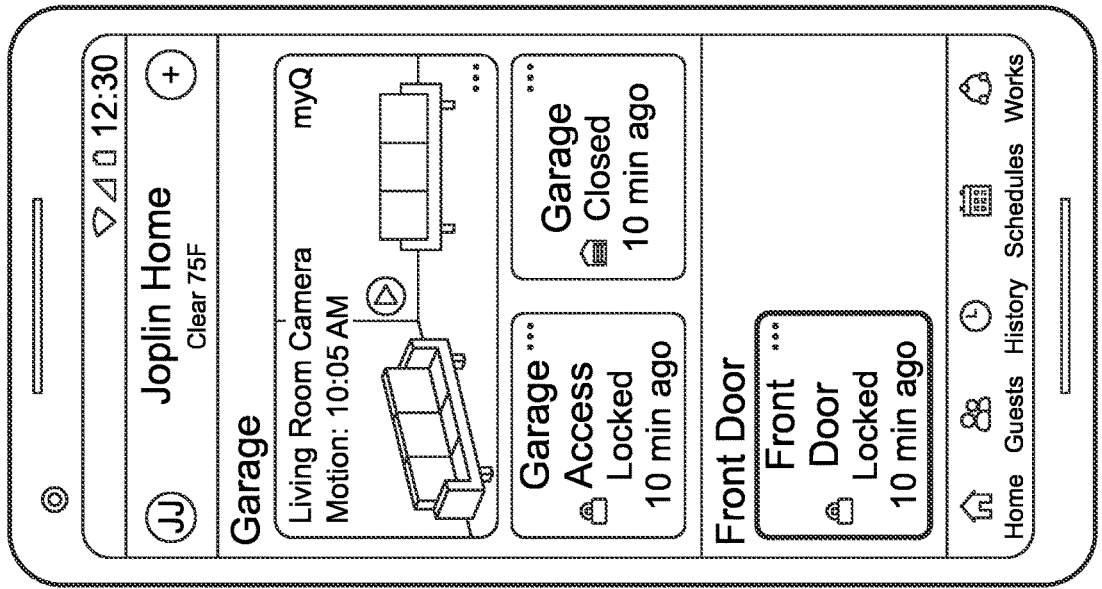
Figure 13B:
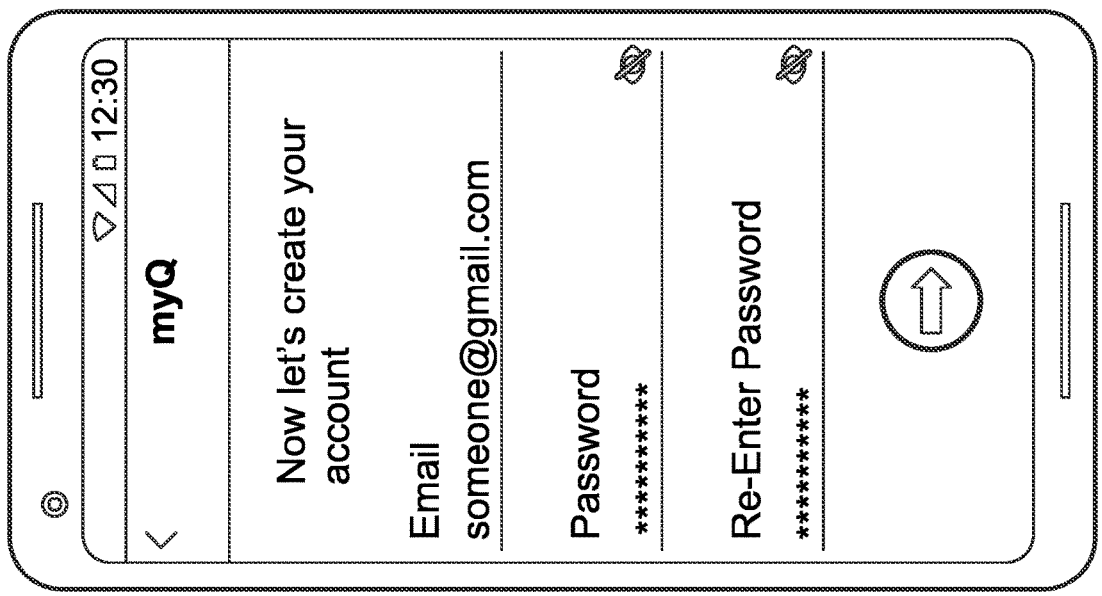

With reference to FIGS. 12A-12C and 13A-13C, illustrations of an example GUI for receiving a transferred credential for controlling a movable barrier system are shown. In FIG. 12A, the transferee is provided with the option to accept an invitation for a transferred credential or create a new account with the server. In some embodiments, the GUI of FIG. 12A may be shown to a transferee when the transferee selects a link (e.g. in an email) provided by the system as notification of the transfer. In FIGS. 12B and 12C, the GUI prompts for and receives the user's information. If no user account is associated with the transferee's email address, the system may prompt the transferee to set up a new account. In FIGS. 13A and 13B, the GUI prompts for and receives email and password to set up an account for the transferee. The movable barrier operator is then added to the newly set up account. In some embodiments, if the transferee email address is already associated with a user account, these steps may be omitted. The movable barrier operator may be added to the new owner's account automatically or with a selection of a link/icon as acceptance of the transfer. FIG. 13C shows a GUI of the new owner, which includes status information controls for the transferred movable barrier operator system.

While the transfer of credentials for controlling a movable barrier operator system is generally described herein, in some embodiments, the systems, methods, and apparatus herein may also be used to transfer ownership of other sensors and devices such as security cameras, door/window sensors, home security/safety smart sensors, etc.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for controlling a movable barrier operator system, the method comprising:
    storing a credential in a memory of a user device associated with a first user account, the credential enabling control of the movable barrier operator system by the user device;
    receiving, at the user device, a user input indicating an intended transfer of the credential from the user device to a second user account; and
    communicating, from the user device, a transfer request to a remote computer in response to receiving the user input,
    wherein the remote computer is configured to transfer the credential to the second user account in response to receiving the transfer request.

2. The method of claim 1, wherein communicating the transfer request to the remote computer comprises communicating, from the user device, the credential to the movable barrier operator system, and wherein the movable barrier operator system is configured to communicate the credential to the remote computer.

3. The method of claim 2, wherein the movable barrier operator system is configured to decrypt the credential and store the credential in a memory.

4. The method of claim 1, further comprising deleting or removing the credential from the user device once the credential has been successfully transferred to the second user account.

5. The method of claim 1, further comprising receiving, at the user device, a new credential derived from the credential.

6. The method of claim 1, wherein communicating the transfer request to the remote computer further comprises transferring the credential to the remote computer.

7. The method of claim 1, wherein the remote computer is configured to communicate information relating to the transfer of the credential to the movable barrier operator system.

8. A non-transitory computer readable medium having instructions which, when executed by a portable electronic device, cause performance of operations comprising:
    receiving, via a user interface of the portable electronic device, a user input indicating an intended transfer of a credential stored in a memory of the portable electronic device, the credential enabling control of a movable barrier operator system;
    communicating, in response to receiving the user input, a transfer request to a remote computer; and
    removing, from the portable electronic device, the credential in response to communicating the transfer request.

9. The non-transitory computer readable medium of claim 8, the operations further comprising receiving, at the portable electronic device from the remote computer, a new credential derived from the credential.

10. The non-transitory computer readable medium of claim 8, wherein communicating the transfer request causes the credential to be transmitted using a distributed ledger.

11. The non-transitory computer readable medium of claim 8, wherein the transfer request is configured to cause, at the remote computer, the credential or a derivative of the credential to be disassociated with a user account of the portable electronic device and associated with another user account.

12. The non-transitory computer readable medium of claim 11, wherein the user account is a homebuilder account, and wherein the other user account is a homeowner account.

13. The non-transitory computer readable medium of claim 8, wherein a user account associated with the credential is configured to generate sub-rights to others to operate the movable barrier operator system.

14. The non-transitory computer readable medium of claim 8, wherein the transfer request is configured to cause the movable barrier operator system to no longer respond to control signals from the portable electronic device.

15. A method of transferring a credential to enable control of a movable barrier operator system, the method comprising:

receiving, at a remote computer, a transfer request to transfer a credential from a first user account to a second user account, wherein the transfer request is received from a user device associated with the first user account, and wherein the transfer request is accompanied by the credential;

communicating, from the remote computer, the credential to a user device associated with the second user account in response to receiving the transfer request; and communicating, from the remote computer, information relating to the transfer of the credential to the movable barrier operator system.

16. The method of claim 15, further comprising:
decrypting, by the remote computer, the credential; and
storing, in remote memory of the remote computer, the decrypted credential.

17. The method of claim 9, further comprising:
receiving, at the remote computer, information associated with sub-rights granted by the first user account or the second user account; and
transferring, by the remote computer, a copy of the credential to a user account that is granted sub-rights.

18. The method of claim 15, further comprising:
operating a client application of a portable electronic device associated with the second user account to output the credential for the movable barrier operator system.

19. The method of claim 15, wherein the first user account is associated with a homebuilder account, and wherein the second user account is associated with a homeowner account.

20. The method of claim 15, further comprising communicating with the first user account to cause deletion or removal of the credential from the user device once the credential has been successfully transferred to the second user account.

* * * * *